United States Patent
Kuriyama

(10) Patent No.: US 11,353,690 B2
(45) Date of Patent: Jun. 7, 2022

(54) ZOOM LENS AND IMAGE PICKUP APPARATUS INCLUDING THE SAME

(71) Applicant: CANON KABUSHIKI KAISHA, Tokyo (JP)

(72) Inventor: Shohei Kuriyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 187 days.

(21) Appl. No.: 16/791,417

(22) Filed: Feb. 14, 2020

(65) Prior Publication Data

US 2020/0278519 A1    Sep. 3, 2020

(30) Foreign Application Priority Data

Feb. 28, 2019    (JP) .............................. JP2019-035211

(51) Int. Cl.
*G02B 15/14*    (2006.01)

(52) U.S. Cl.
CPC ................. *G02B 15/1465* (2019.08)

(58) Field of Classification Search
CPC ......... G02B 15/1425; G02B 15/1435–143507; G02B 15/1445–144515; G02B 15/1455–145531; G02B 15/1465; G02B 15/20

See application file for complete search history.

(56) References Cited

U.S. PATENT DOCUMENTS

| 2014/0139722 A1* | 5/2014 | Sugita ................. G02B 15/173 348/345 |
| 2014/0211082 A1 | 7/2014 | Imaoka |
| 2021/0033834 A1* | 2/2021 | Machida ............. G02B 15/177 |

FOREIGN PATENT DOCUMENTS

JP    2015215438 A    * 12/2015

* cited by examiner

*Primary Examiner* — George G. King
(74) *Attorney, Agent, or Firm* — Canon U.S.A., Inc. IP Division

(57) ABSTRACT

Provided is a zoom lens, which includes lens units, in which an interval between each pair of adjacent lens units is changed during zooming, the zoom lens including, in order from an object side to an image side: a first lens unit having a negative refractive power; a first lens subunit having a positive refractive power; and a second lens subunit having a negative refractive power. During focusing from infinity to minimum object distance, the first lens subunit is moved toward the object side, and the second lens subunit is moved toward the image side. Further, a movement amount of the first lens subunit during focusing from infinity to minimum object distance at a telephoto end, a movement amount of the second lens subunit during focusing from infinity to minimum object distance at the telephoto end, and a focal length at the telephoto end are appropriately set.

19 Claims, 19 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, and more particularly, to a zoom lens that is suitable as an image pickup optical system for use with image pickup apparatus, such as a digital still camera, a digital video camera, a broadcasting camera, and a monitoring camera.

Description of the Related Art

It is required of an image pickup optical system for use with an image pickup apparatus (camera) to be a zoom lens encompassing a wide image pickup angle of view, and having a high resolution and a small size as an entire system. It is further required of the image pickup optical system to be a zoom lens configured to easily pick up an image at an object point at closer minimum object distance, for example.

In the related art, as the zoom lens having a wide angle of view and a small size as the entire system, there are known negative-lead-type zoom lenses in which a lens unit having a negative refractive power is arranged closest to an object side. Of the negative-lead-type zoom lenses, there is known a zoom lens adopting a floating system, in which a plurality of lens units are moved along different loci for focusing in order to maintain optical performance at close distance satisfactorily (U.S. Patent Application Publication No. 2014/0211082).

In U.S. Patent Application Publication No. 2014/0211082, the floating system is adopted over the entire zoom range from a wide-angle end to a telephoto end to obtain the high optical performance from infinity to close distance.

SUMMARY

According to an aspect of the embodiments, a zoom lens includes a plurality of lens units, in which an interval between each pair of adjacent lens units is changed during zooming, the zoom lens including, in order from an object side to an image side: a first lens unit having a negative refractive power; a first lens subunit having a positive refractive power; and a second lens subunit having a negative refractive power, wherein, during focusing from infinity to minimum object distance, the first lens subunit is configured to move toward the object side, and the second lens subunit is configured to move toward the image side, and wherein the following inequality is satisfied:

$$0.20 < (mB - mA)/ft < 1.00,$$

where mA is a movement amount of the first lens subunit during focusing from infinity to minimum object distance at a telephoto end, mB is a movement amount of the second lens subunit during focusing from infinity to minimum object distance at the telephoto end, and ft is a focal length of the zoom lens at the telephoto end, wherein the movement amounts mA and mB each has a positive sign when being a movement amount from the object side to the image side.

Further, according to at least one embodiment of the present disclosure, there is provided an image pickup apparatus including: a zoom lens; and an image pickup element configured to receive an image formed by the zoom lens, the zoom lens being a zoom lens including a plurality of lens units, in which an interval between each pair of adjacent lens units is changed during zooming, the zoom lens including, in order from an object side to an image side: a first lens unit having a negative refractive power; a first lens subunit having a positive refractive power; and a second lens subunit having a negative refractive power, wherein, during focusing from infinity to minimum object distance, the first lens subunit is configured to move toward the object side, and the second lens subunit is configured to move toward the image side, and wherein the following inequality is satisfied:

$$0.20 < (mB - mA)/ft < 1.00,$$

where mA is a movement amount of the first lens subunit during focusing from infinity to minimum object distance at a telephoto end, mB is a movement amount of the second lens subunit during focusing from infinity to minimum object distance at the telephoto end, and ft is a focal length of the zoom lens at the telephoto end, wherein the movement amounts mA and mB each has a positive sign when being a movement amount from the object side to the image side.

Further features of the present disclosure will become apparent from the following description of exemplary embodiments with reference to the attached drawings.

DESCRIPTION OF THE EMBODIMENTS

Figure 1:
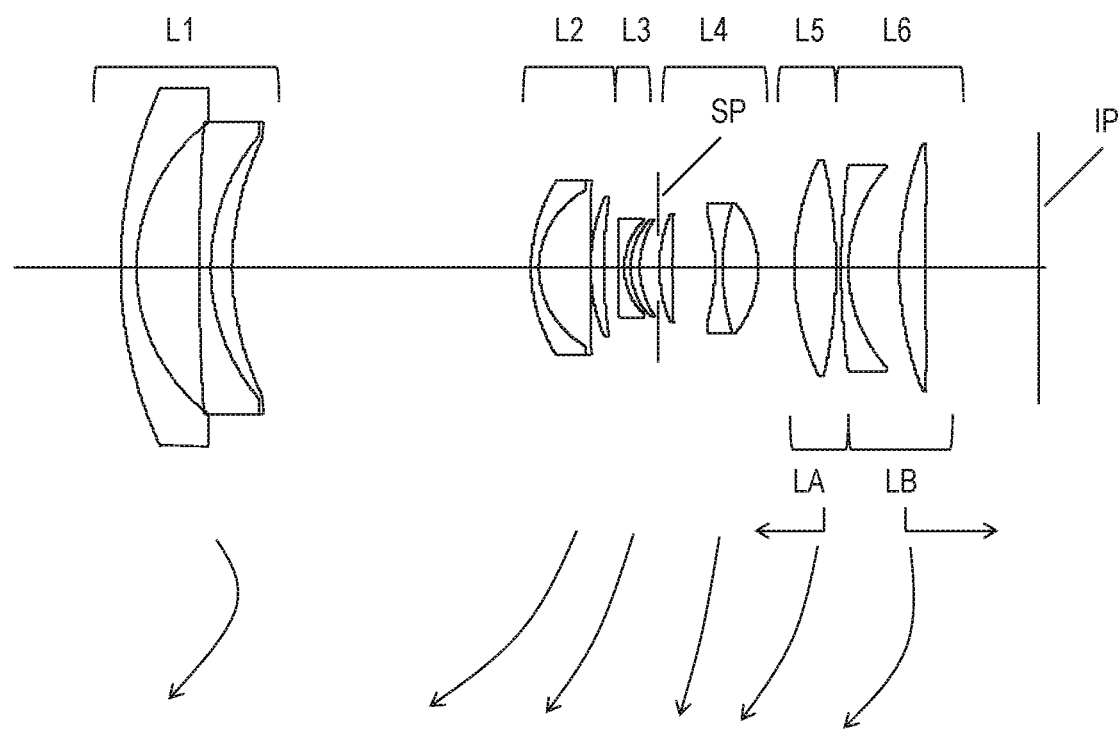
FIG. 1 is a lens cross-sectional view of a zoom lens according to Embodiment 1 of the present disclosure.
Figure 2A:
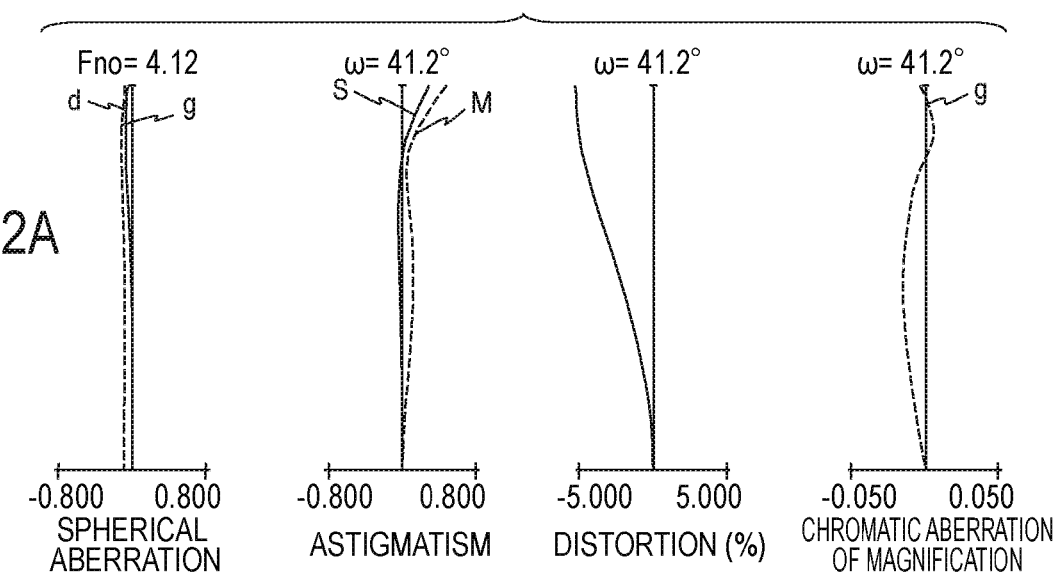
FIG. 2A is a longitudinal aberration diagram of the zoom lens according to Embodiment 1 of the present disclosure at an object distance of infinity and at a wide-angle end.
Figure 2B:
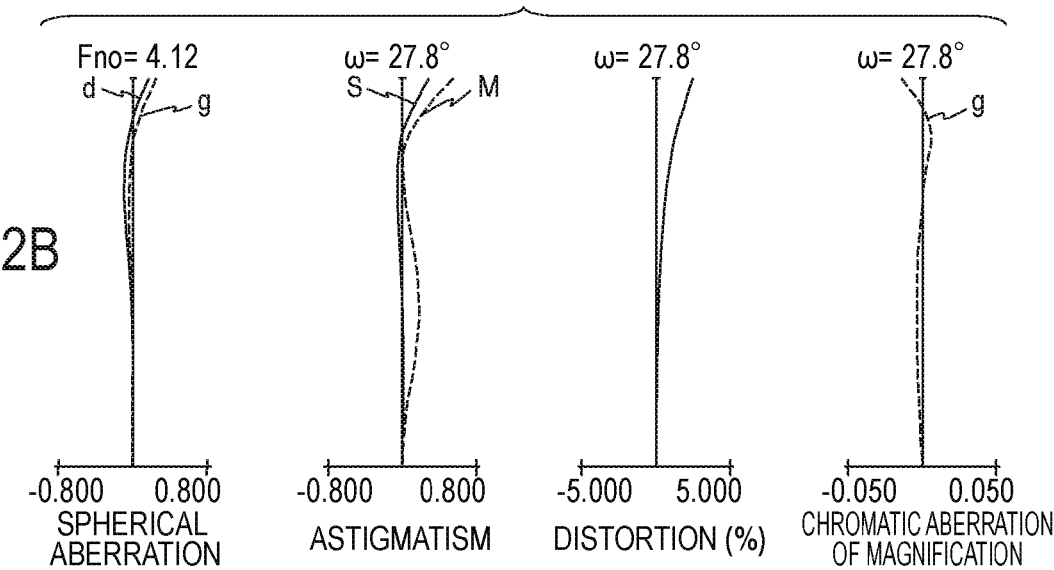
FIG. 2B is a longitudinal aberration diagram of the zoom lens according to Embodiment 1 of the present disclosure at the object distance of infinity and at an intermediate zoom position.
Figure 2C:
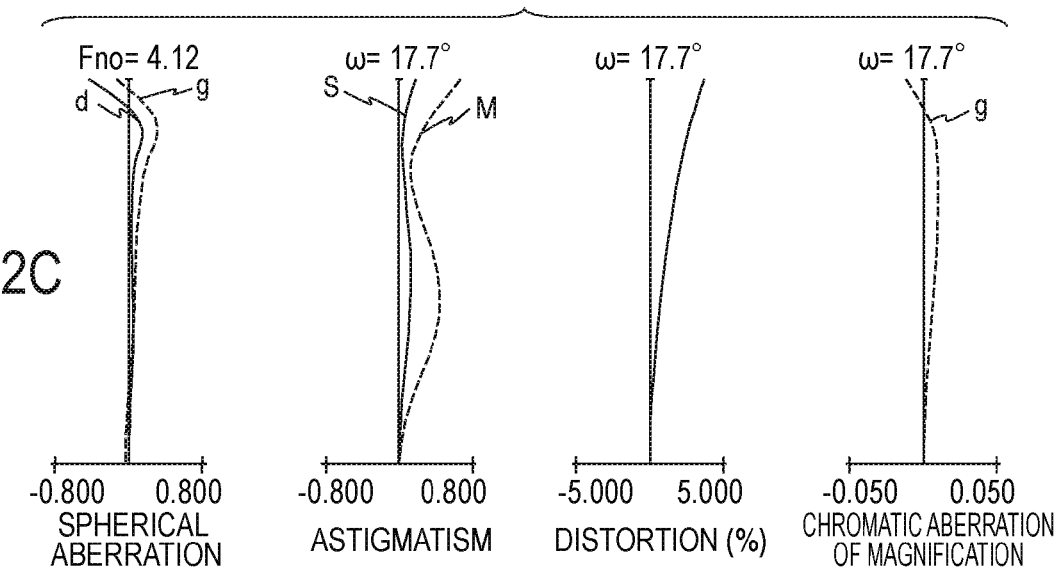
FIG. 2C is a longitudinal aberration diagram of the zoom lens according to Embodiment 1 of the present disclosure at the object distance of infinity and at a telephoto end.
Figure 3A:
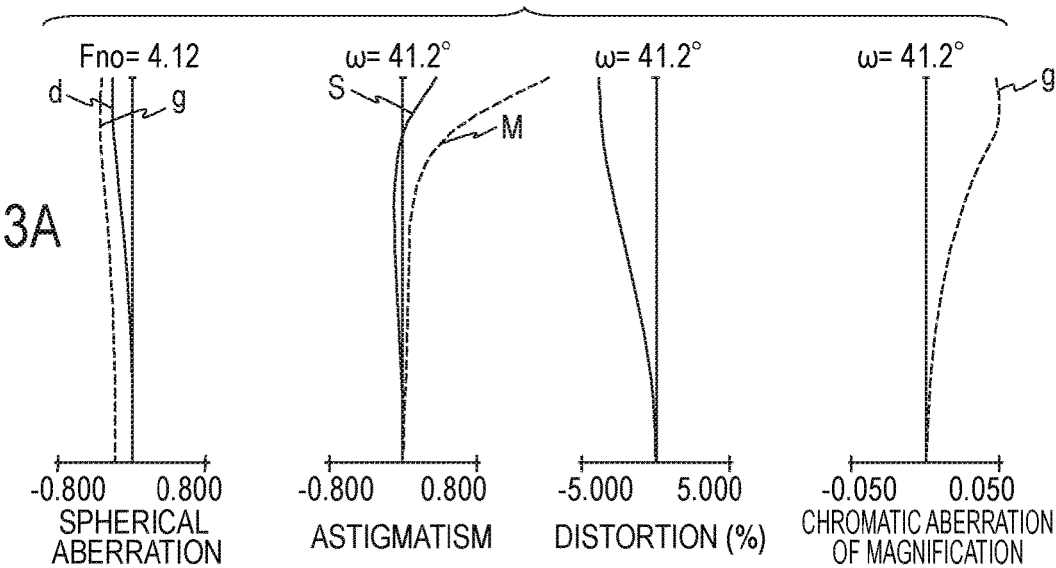
FIG. 3A is a longitudinal aberration diagram of the zoom lens according to Embodiment 1 of the present disclosure at an object distance of minimum object distance (0.2 m) and at the wide-angle end.
Figure 3B:
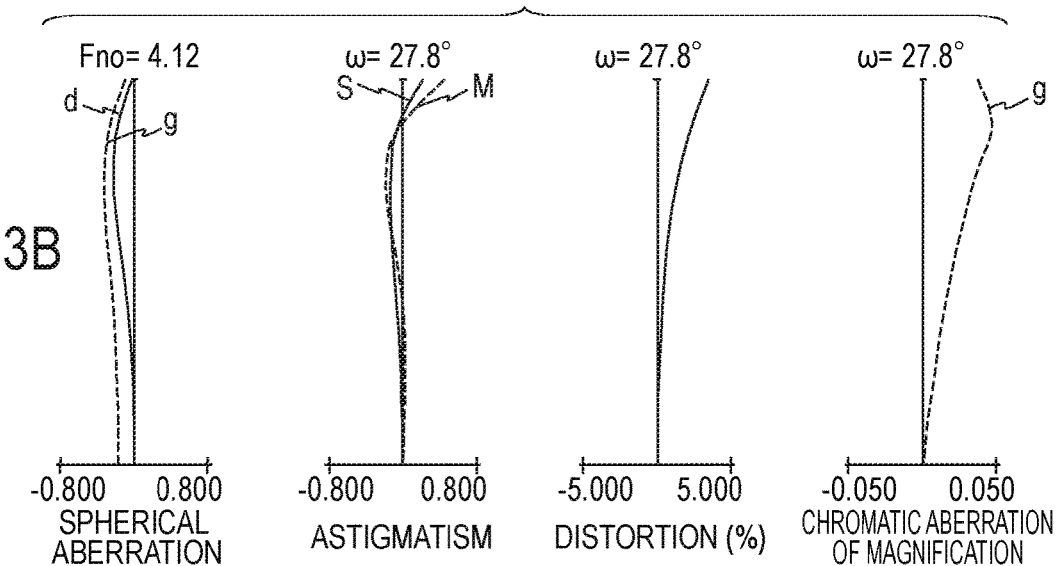
FIG. 3B is a longitudinal aberration diagram of the zoom lens according to Embodiment 1 of the present disclosure at the object distance of minimum object distance (0.2 m) and at the intermediate zoom position.
Figure 3C:
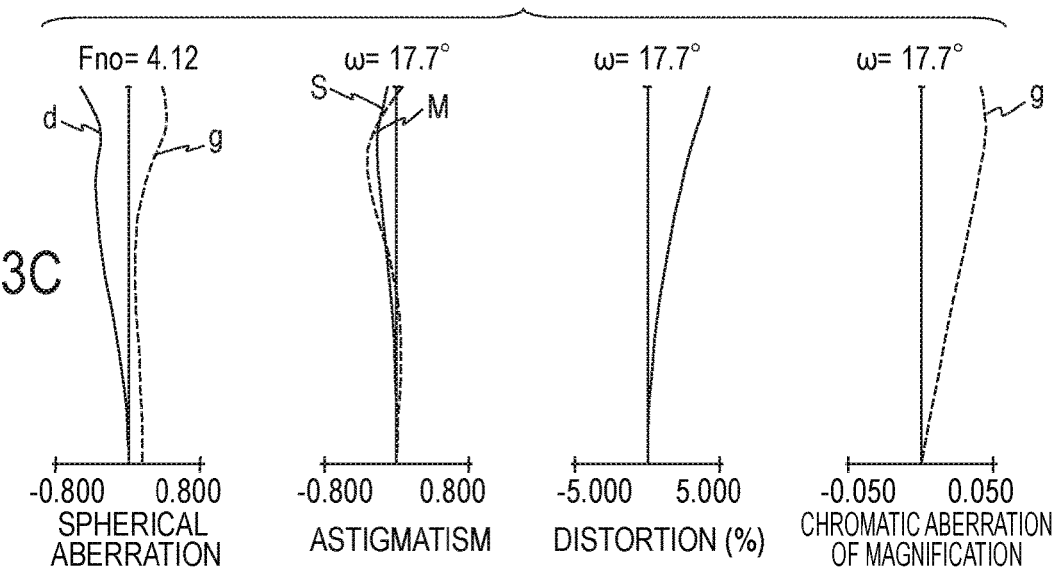
FIG. 3C is a longitudinal aberration diagram of the zoom lens according to Embodiment 1 of the present disclosure at the object distance of minimum object distance (0.2 m) and at the telephoto end.
Figure 4:
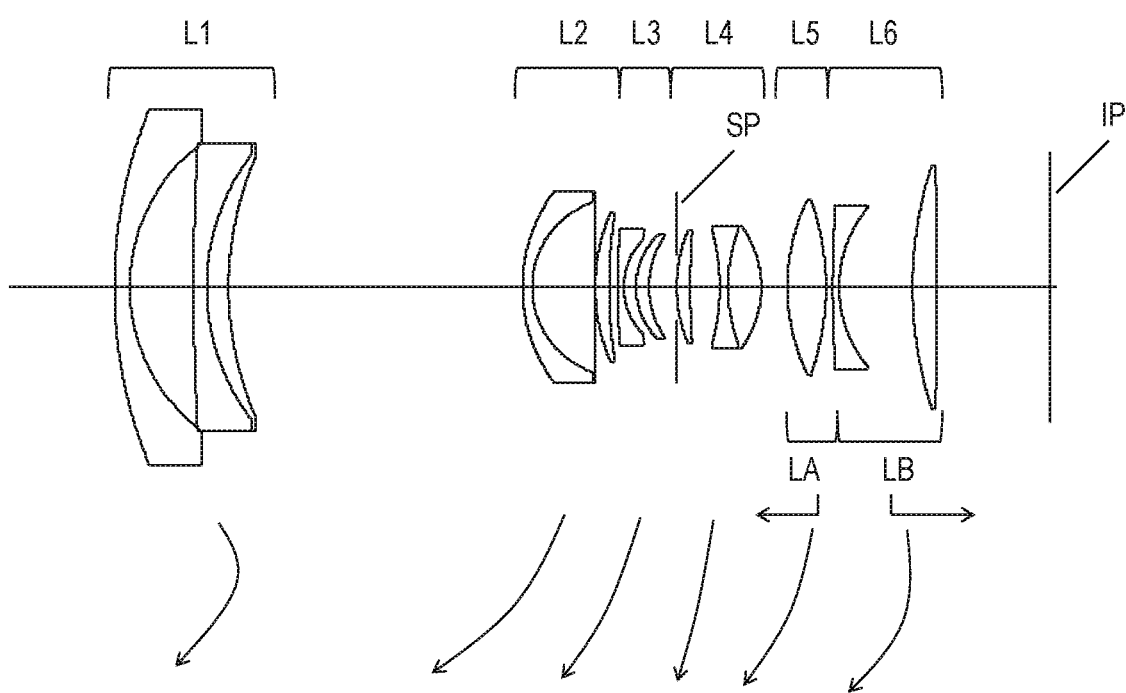
FIG. 4 is a lens cross-sectional view of a zoom lens according to Embodiment 2 of the present disclosure.
Figure 5A:
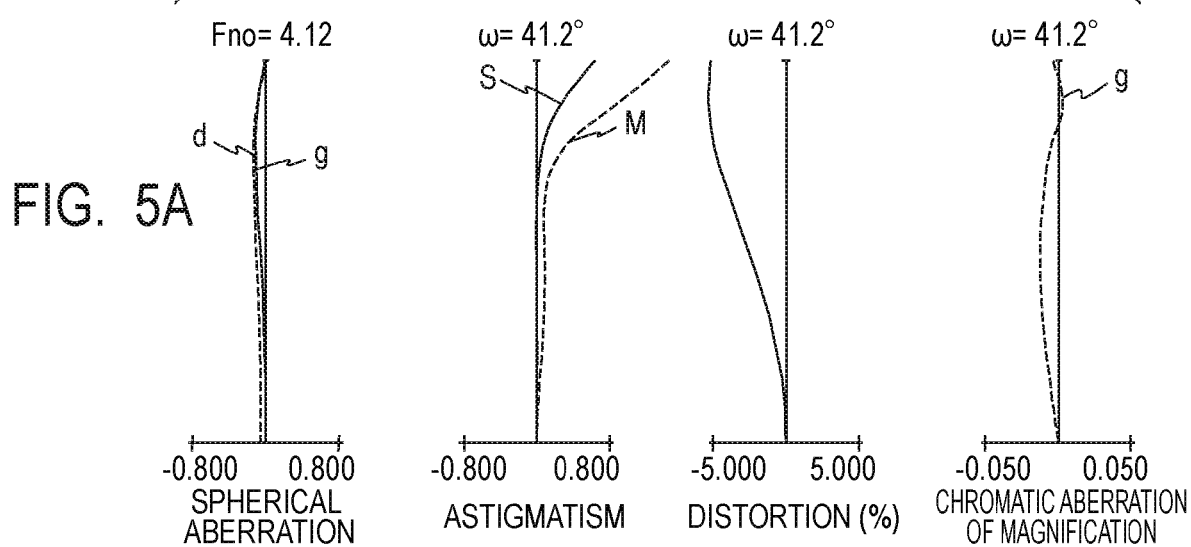
FIG. 5A is a longitudinal aberration diagram of the zoom lens according to Embodiment 2 of the present disclosure at an object distance of infinity and at a wide-angle end.
Figure 5B:
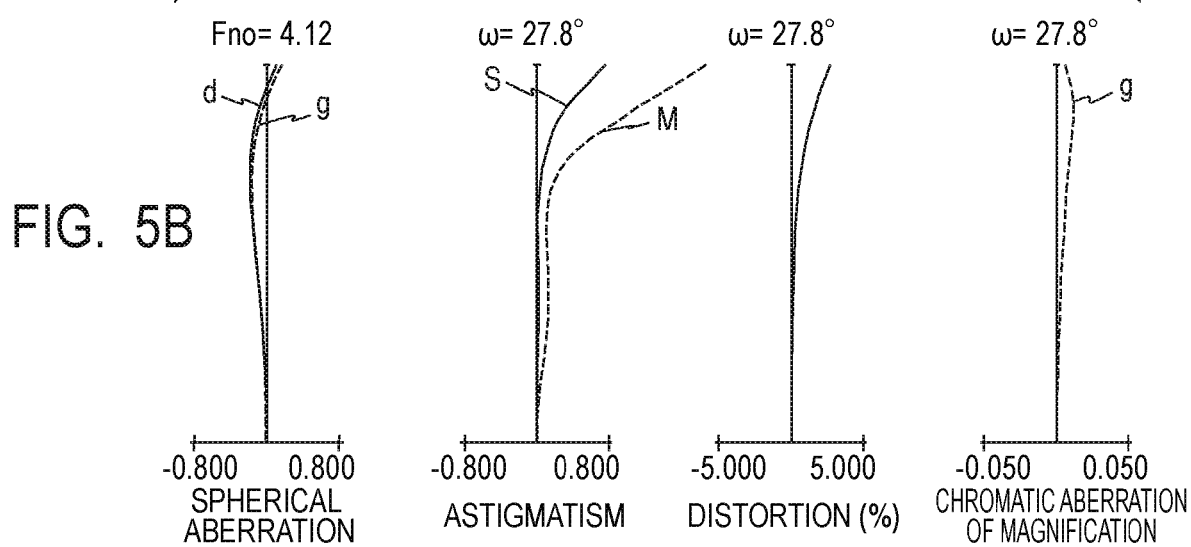
FIG. 5B is a longitudinal aberration diagram of the zoom lens according to Embodiment 2 of the present disclosure at the object distance of infinity and at an intermediate zoom position.
Figure 5C:
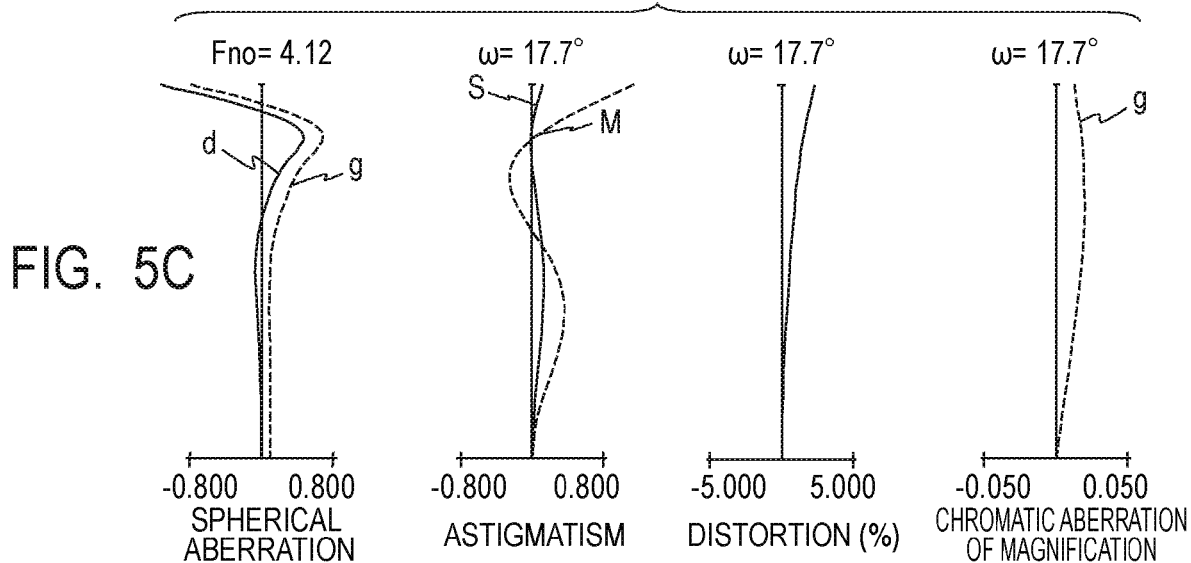
FIG. 5C is a longitudinal aberration diagram of the zoom lens according to Embodiment 2 of the present disclosure at the object distance of infinity and at a telephoto end.
Figure 6A:
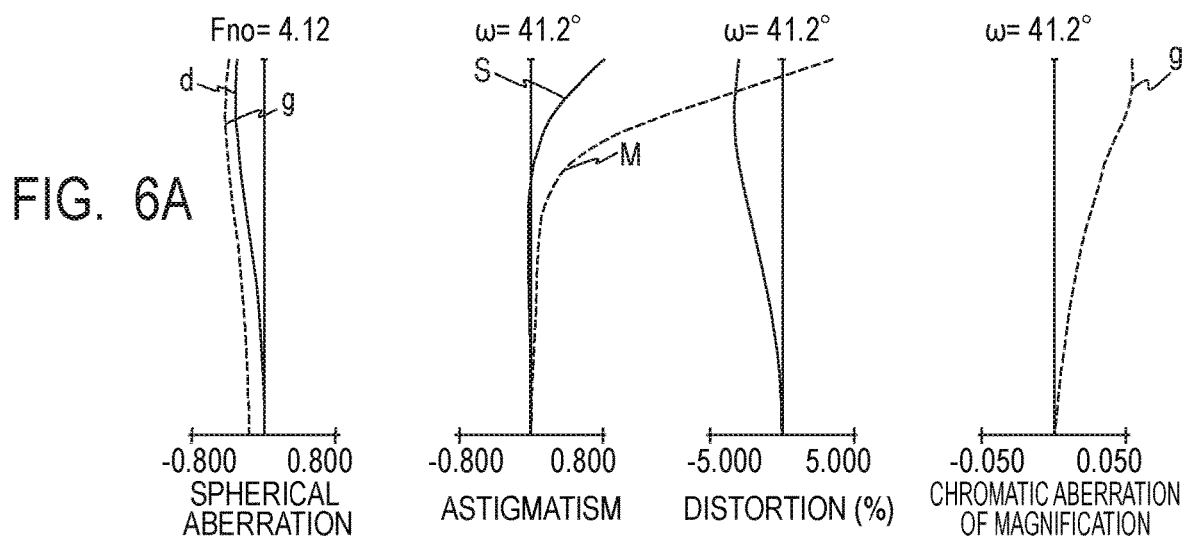
FIG. 6A is a longitudinal aberration diagram of the zoom lens according to Embodiment 2 of the present disclosure at an object distance of minimum object distance (0.2 m) and at the wide-angle end.
Figure 6B:
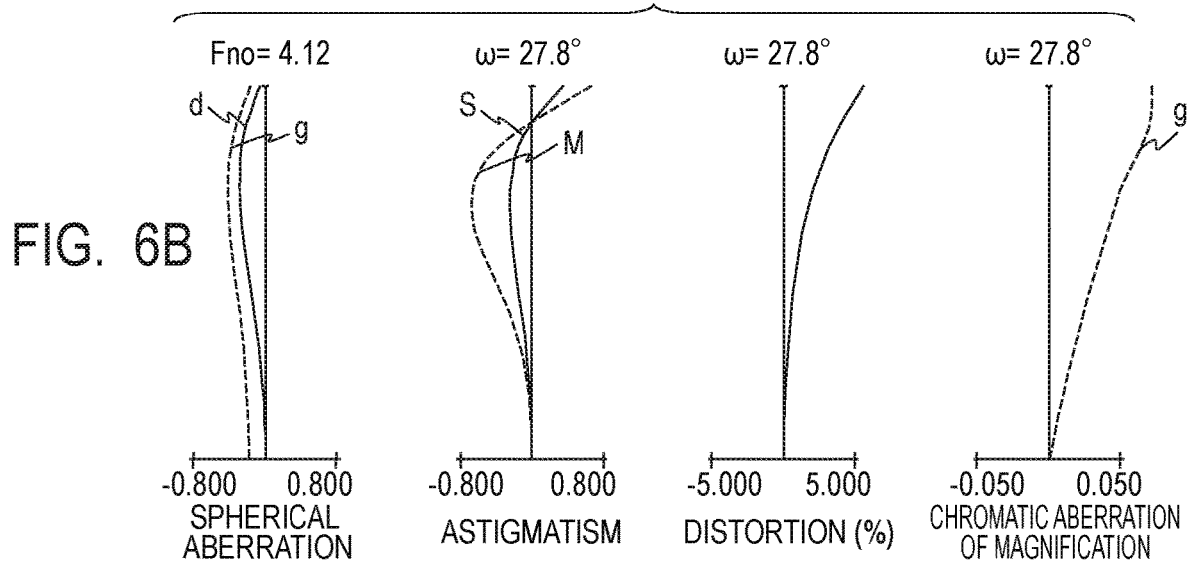
FIG. 6B is a longitudinal aberration diagram of the zoom lens according to Embodiment 2 of the present disclosure at the object distance of minimum object distance (0.2 m) and at the intermediate zoom position.
Figure 6C:
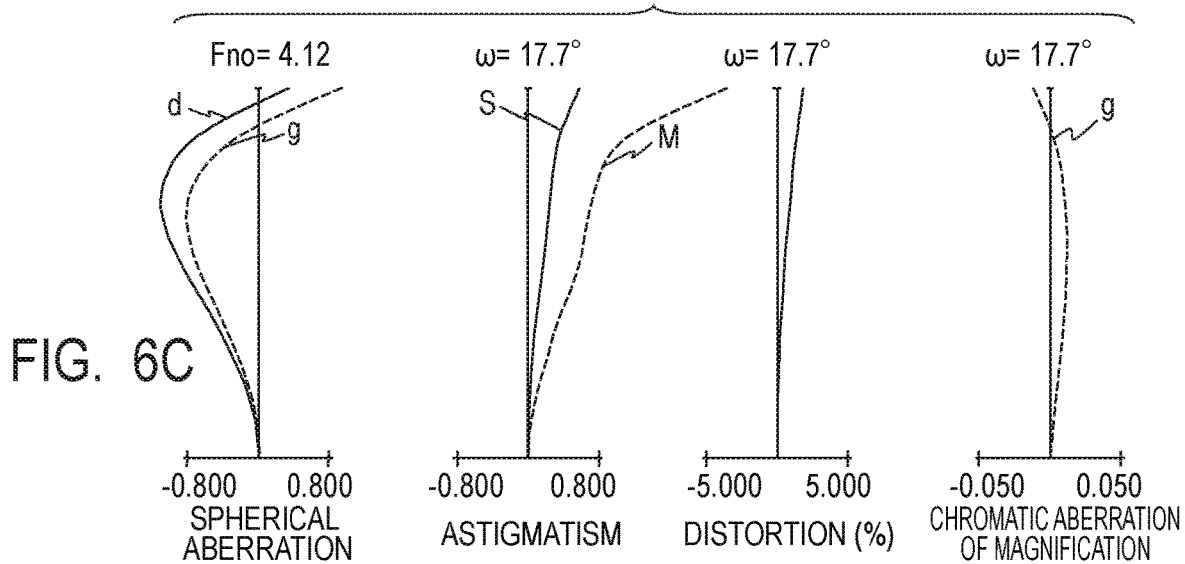
FIG. 6C is a longitudinal aberration diagram of the zoom lens according to Embodiment 2 of the present disclosure at the object distance of minimum object distance (0.2 m) and at the telephoto end.
Figure 7:
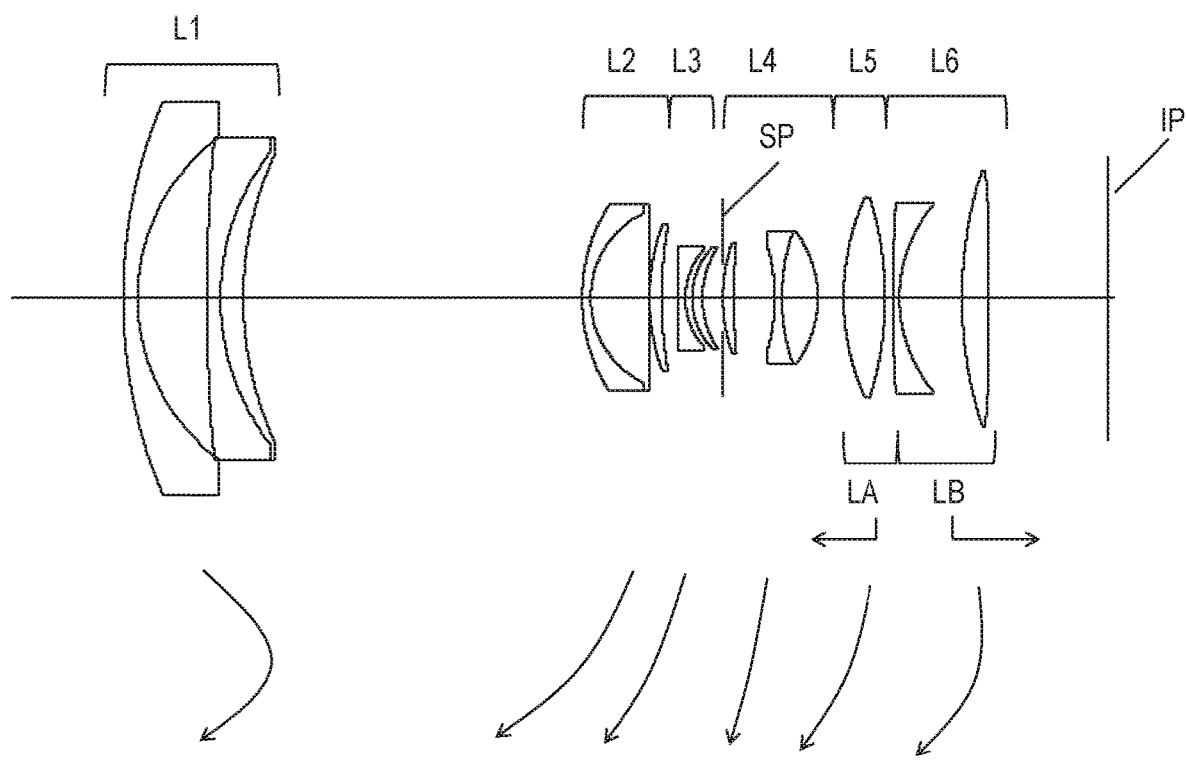
FIG. 7 is a lens cross-sectional view of a zoom lens according to Embodiment 3 of the present disclosure.
Figure 8A:
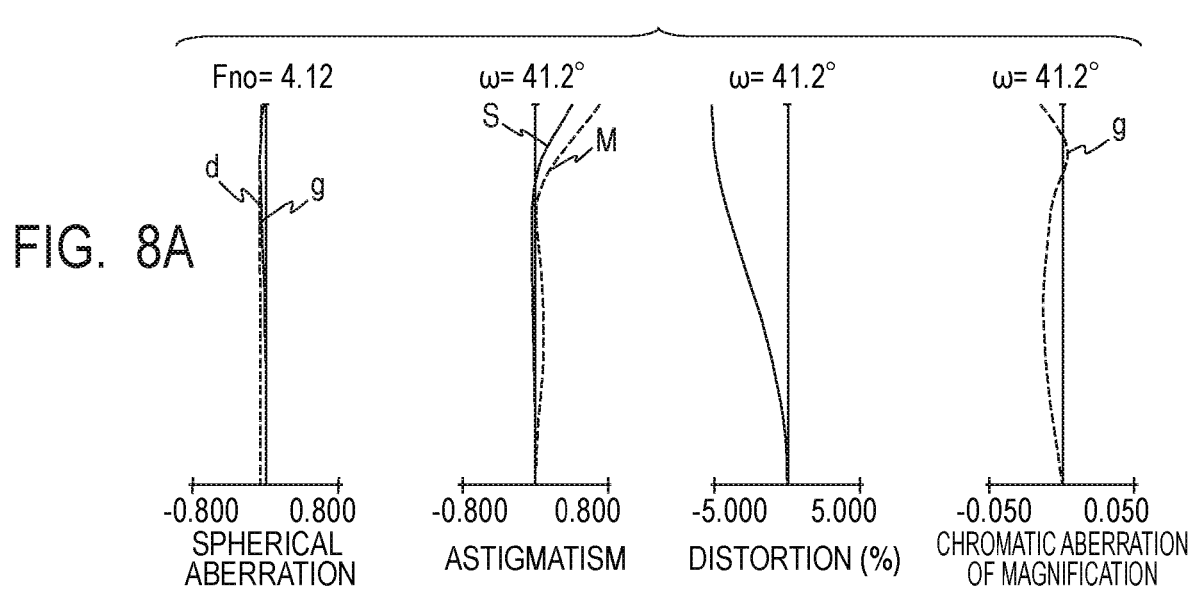
FIG. 8A is a longitudinal aberration diagram of the zoom lens according to Embodiment 3 of the present disclosure at an object distance of infinity and at a wide-angle end.
Figure 8B:
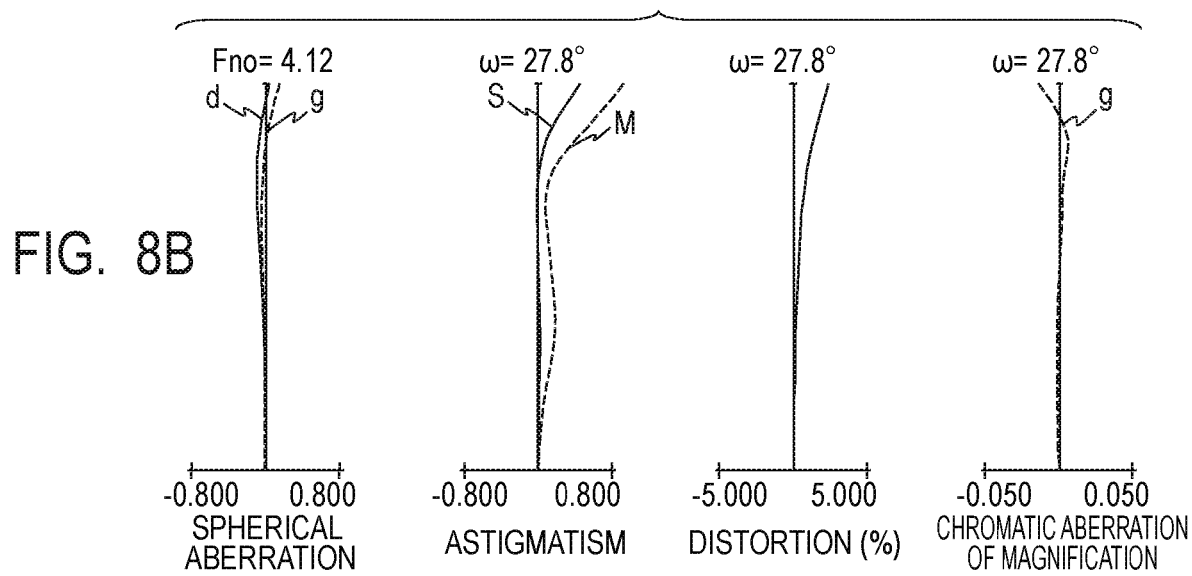
FIG. 8B is a longitudinal aberration diagram of the zoom lens according to Embodiment 3 of the present disclosure at the object distance of infinity and at an intermediate zoom position.
Figure 8C:
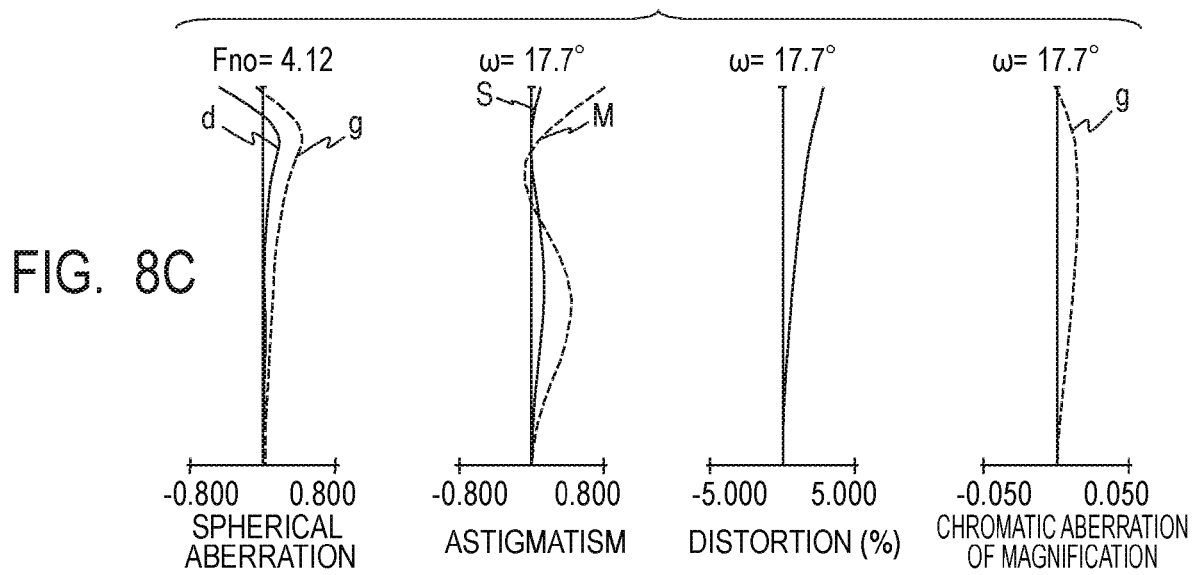
FIG. 8C is a longitudinal aberration diagram of the zoom lens according to Embodiment 3 of the present disclosure at the object distance of infinity and at a telephoto end.
Figure 9A:
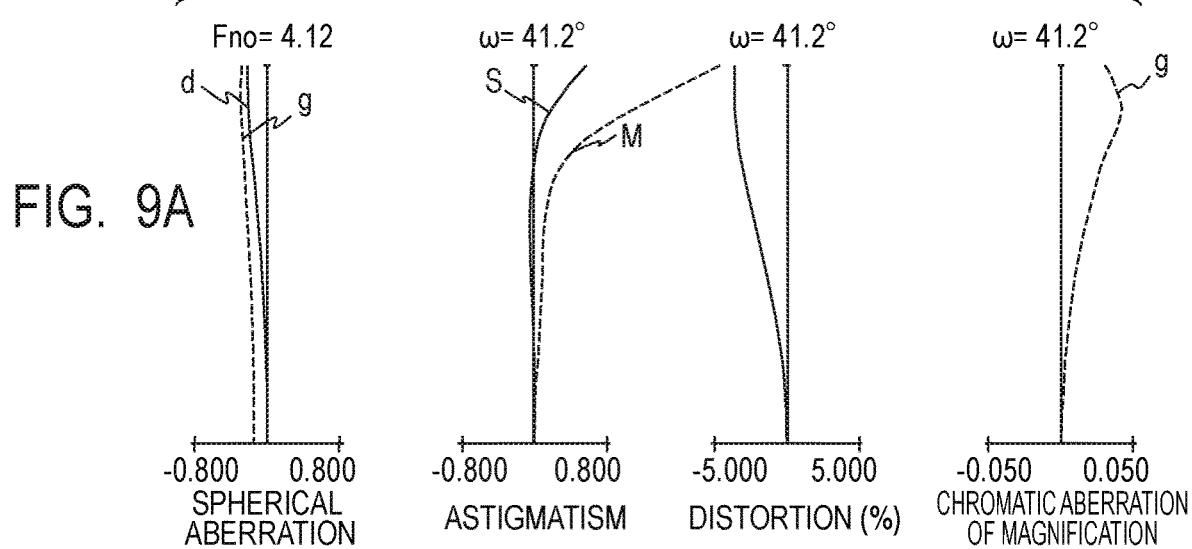
FIG. 9A is a longitudinal aberration diagram of the zoom lens according to Embodiment 3 of the present disclosure at an object distance of minimum object distance (0.22 m) and at the wide-angle end.
Figure 9B:
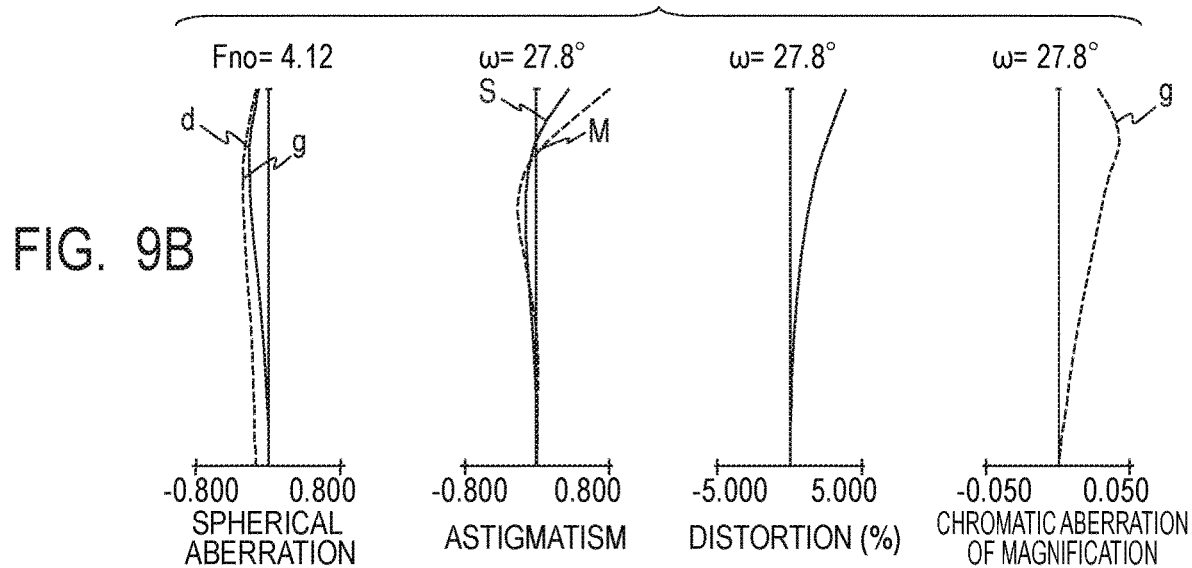
FIG. 9B is a longitudinal aberration diagram of the zoom lens according to Embodiment 3 of the present disclosure at the object distance of minimum object distance (0.22 m) and at the intermediate zoom position.
Figure 9C:
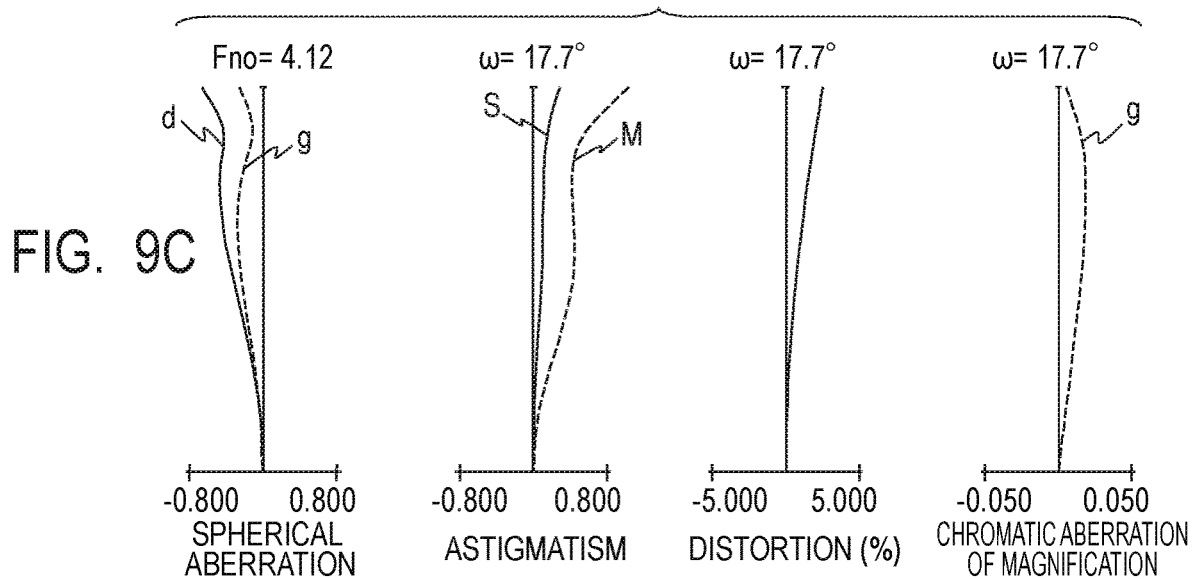
FIG. 9C is a longitudinal aberration diagram of the zoom lens according to Embodiment 3 of the present disclosure at the object distance of minimum object distance (0.22 m) and at the telephoto end.
Figure 10:
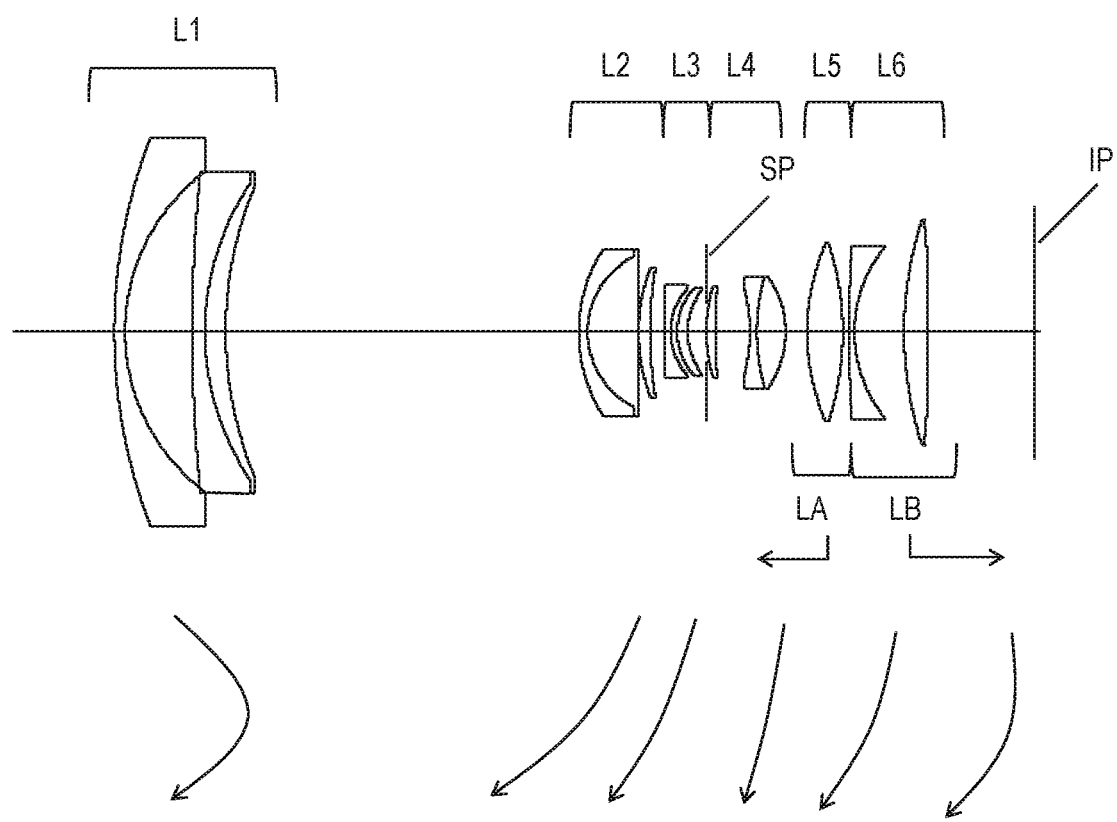
FIG. 10 is a lens cross-sectional view of a zoom lens according to Embodiment 4 of the present disclosure.
Figure 11A:
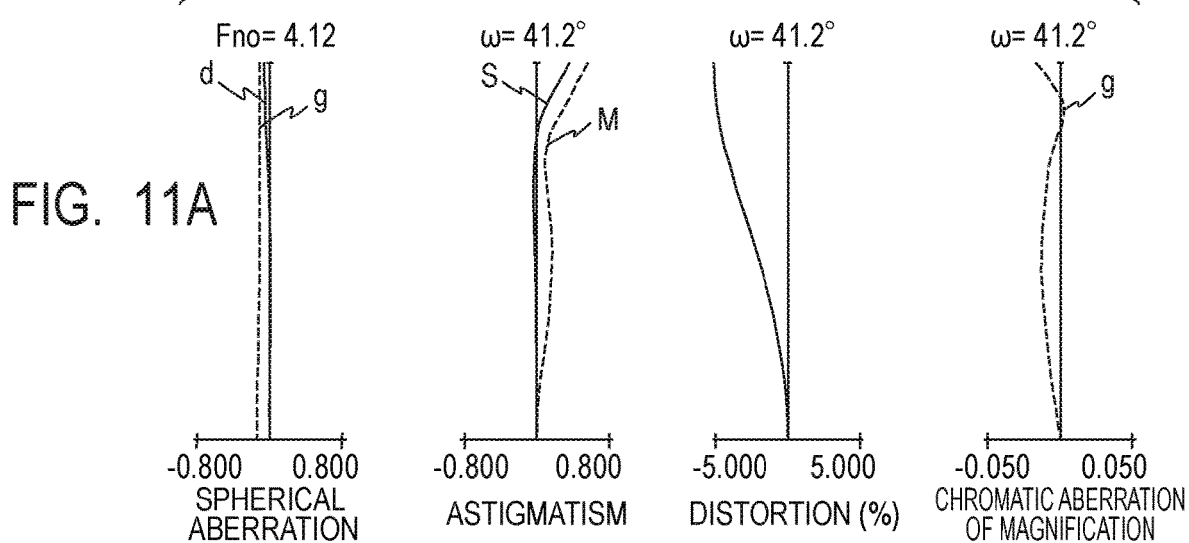
FIG. 11A is a longitudinal aberration diagram of the zoom lens according to Embodiment 4 of the present disclosure at an object distance of infinity and at a wide-angle end.
Figure 11B:
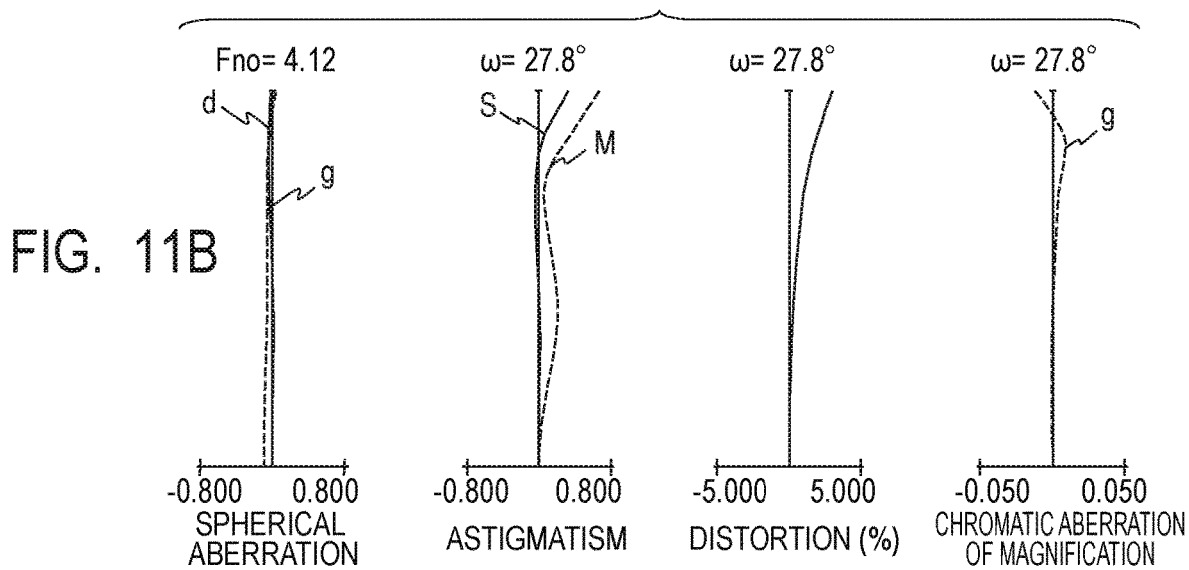
FIG. 11B is a longitudinal aberration diagram of the zoom lens according to Embodiment 4 of the present disclosure at the object distance of infinity and at an intermediate zoom position.
Figure 11C:
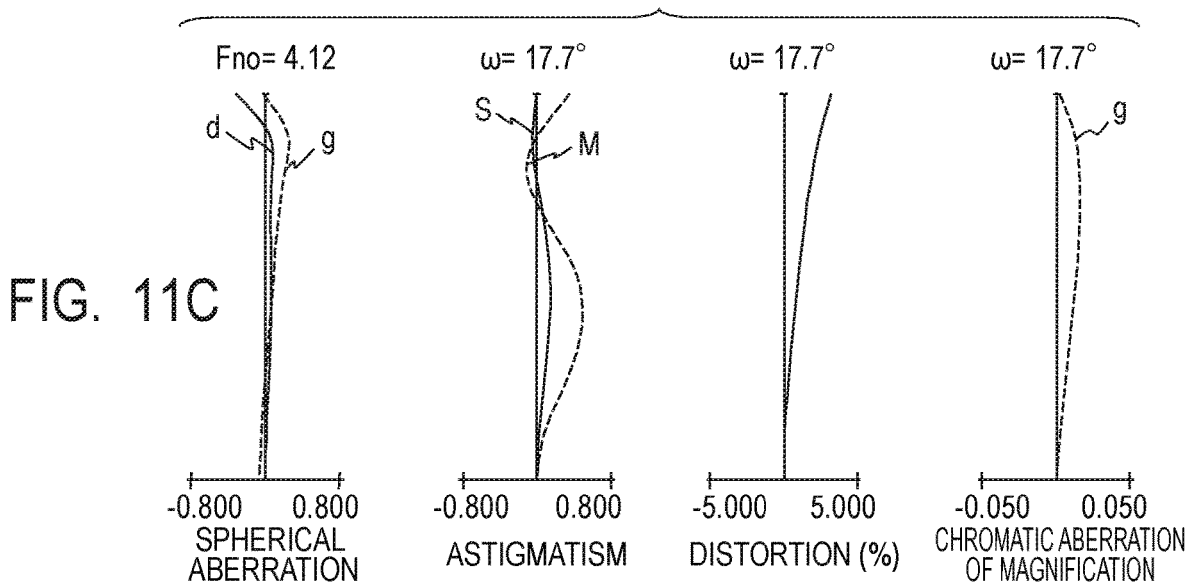
FIG. 11C is a longitudinal aberration diagram of the zoom lens according to Embodiment 4 of the present disclosure at the object distance of infinity and at a telephoto end.
Figure 12A:
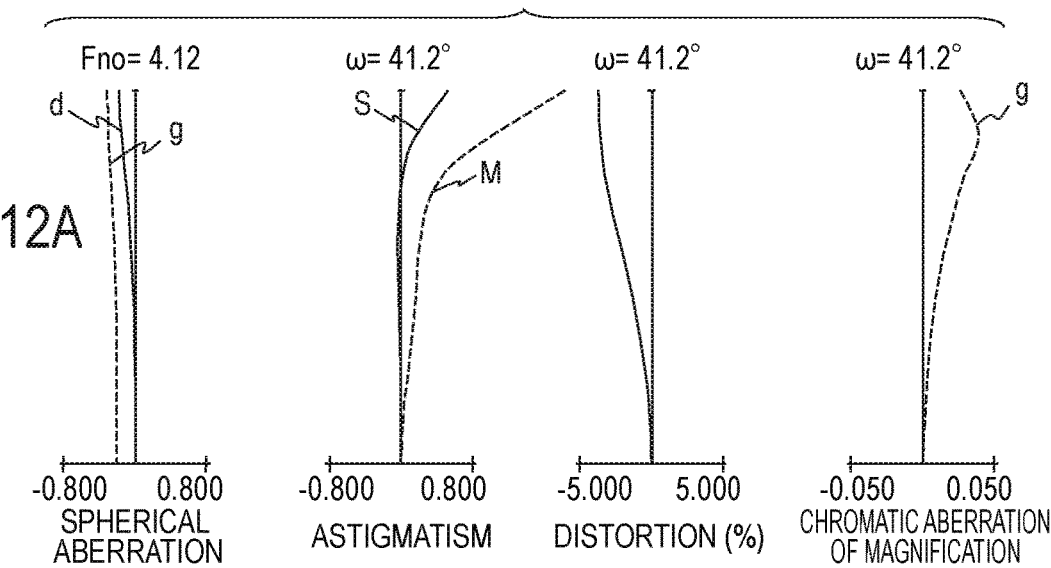
FIG. 12A is a longitudinal aberration diagram of the zoom lens according to Embodiment 4 of the present disclosure at an object distance of minimum object distance (0.25 m) and at the wide-angle end.
Figure 12B:
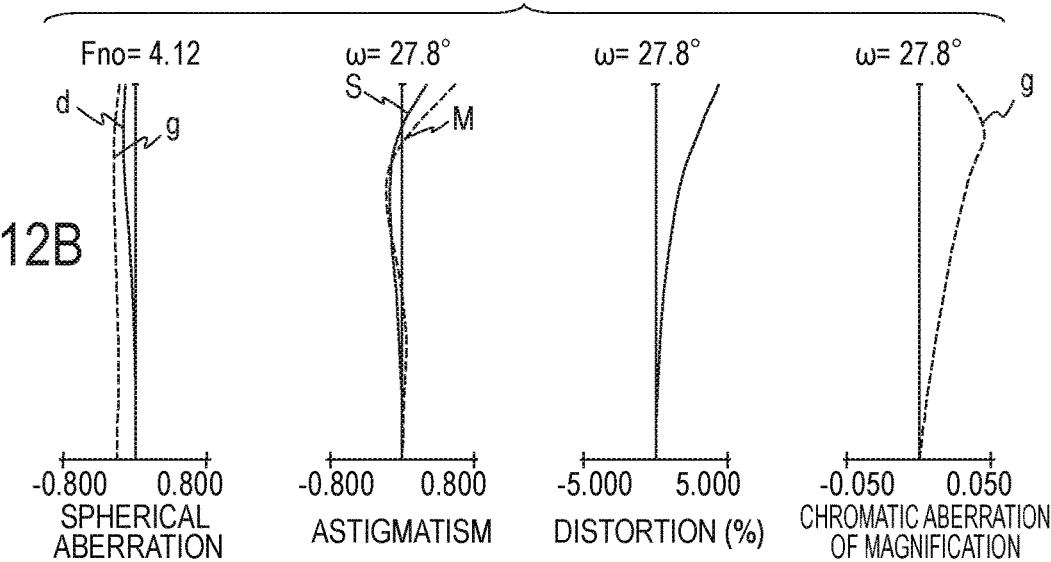
FIG. 12B is a longitudinal aberration diagram of the zoom lens according to Embodiment 4 of the present disclosure at the object distance of minimum object distance (0.25 m) and at the intermediate zoom position.
Figure 12C:
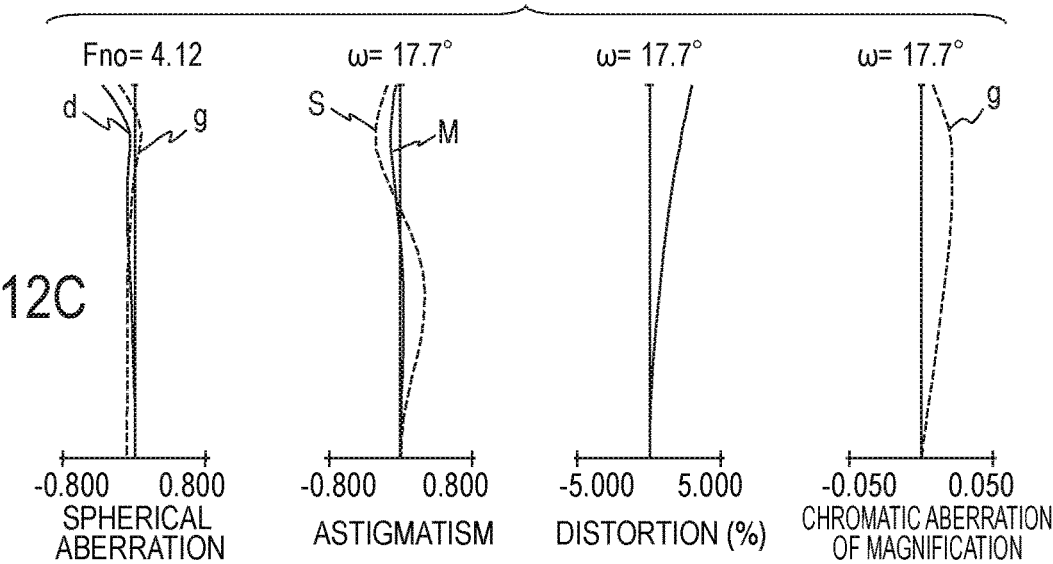
FIG. 12C is a longitudinal aberration diagram of the zoom lens according to Embodiment 4 of the present disclosure at the object distance of minimum object distance (0.25 m) and at the telephoto end.
Figure 13:
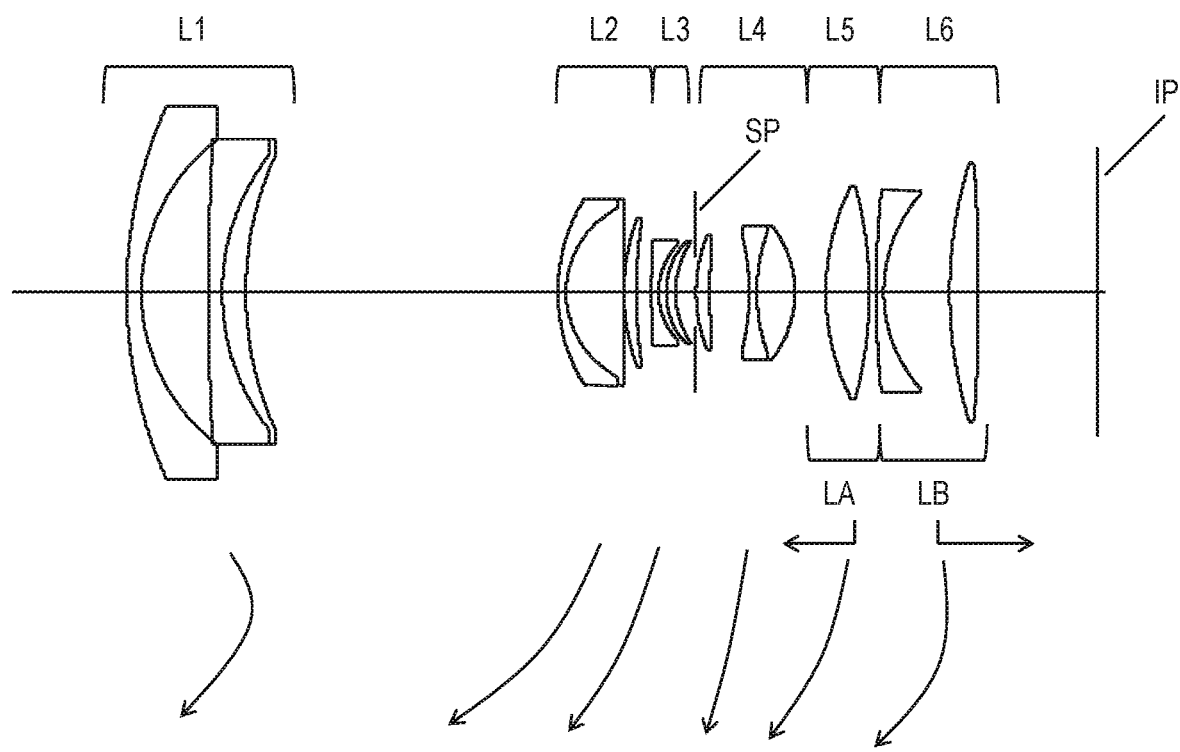
FIG. 13 is a lens cross-sectional view of a zoom lens according to Embodiment 5 of the present disclosure.
Figure 14A:
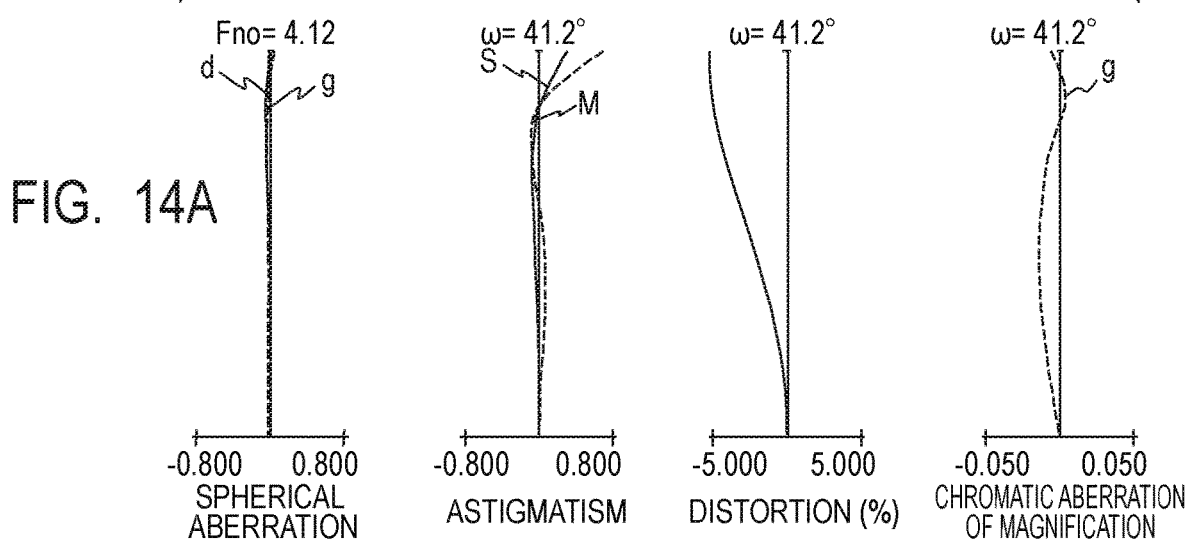
FIG. 14A is a longitudinal aberration diagram of the zoom lens according to Embodiment 5 of the present disclosure at an object distance of infinity and at a wide-angle end.
Figure 14B:
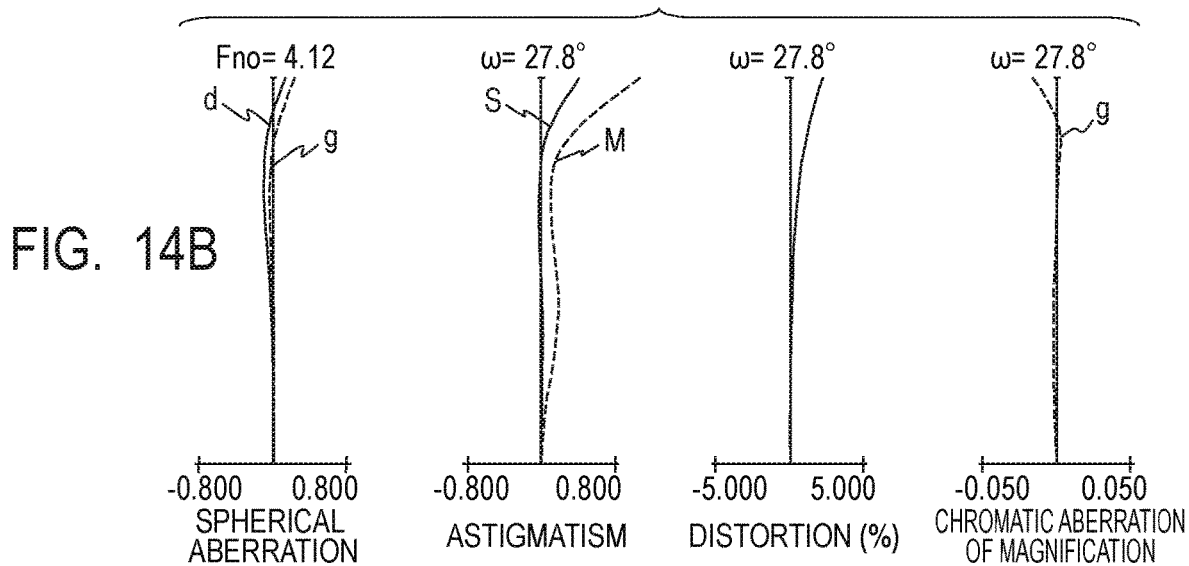
FIG. 14B is a longitudinal aberration diagram of the zoom lens according to Embodiment 5 of the present disclosure at the object distance of infinity and at an intermediate zoom position.
Figure 14C:
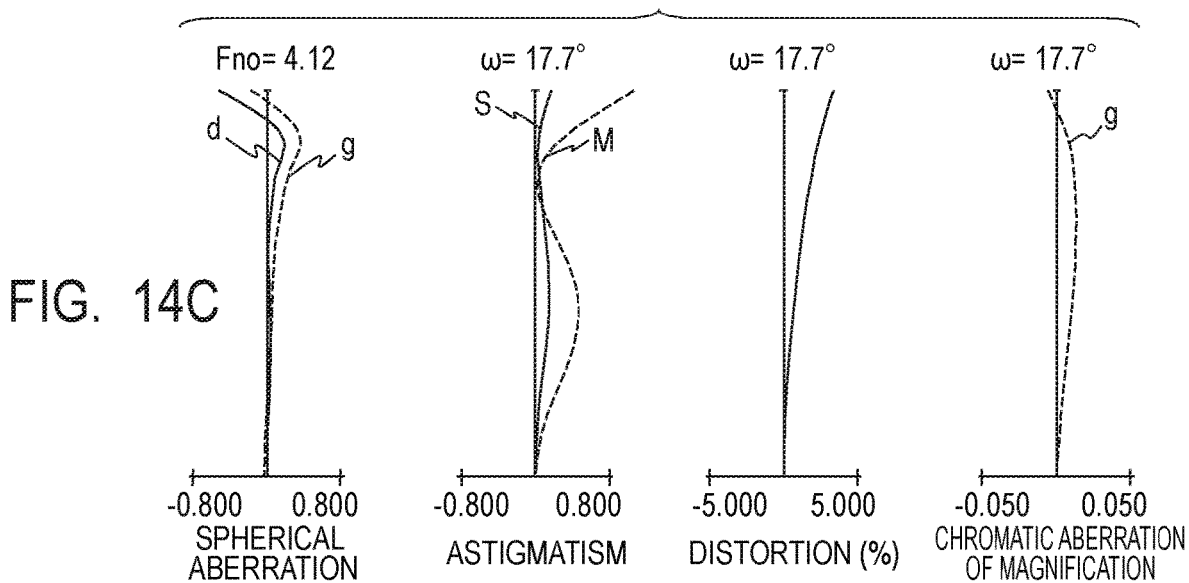
FIG. 14C is a longitudinal aberration diagram of the zoom lens according to Embodiment 5 of the present disclosure at the object distance of infinity and at a telephoto end.
Figure 15A:
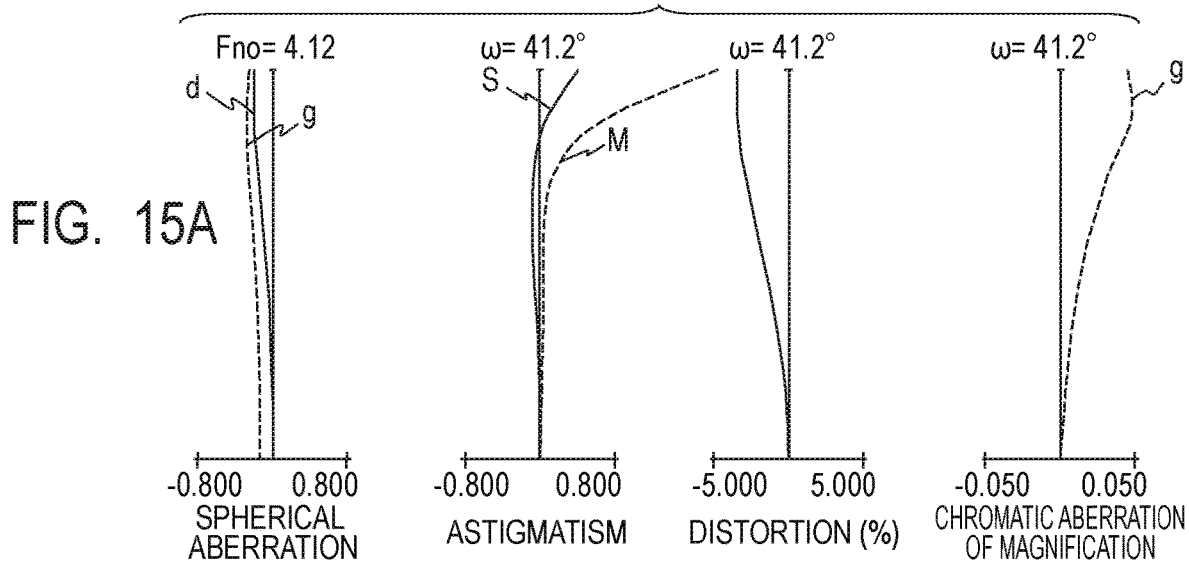
FIG. 15A is a longitudinal aberration diagram of the zoom lens according to Embodiment 5 of the present disclosure at an object distance of minimum object distance (0.2 m) and at the wide-angle end.
Figure 15B:
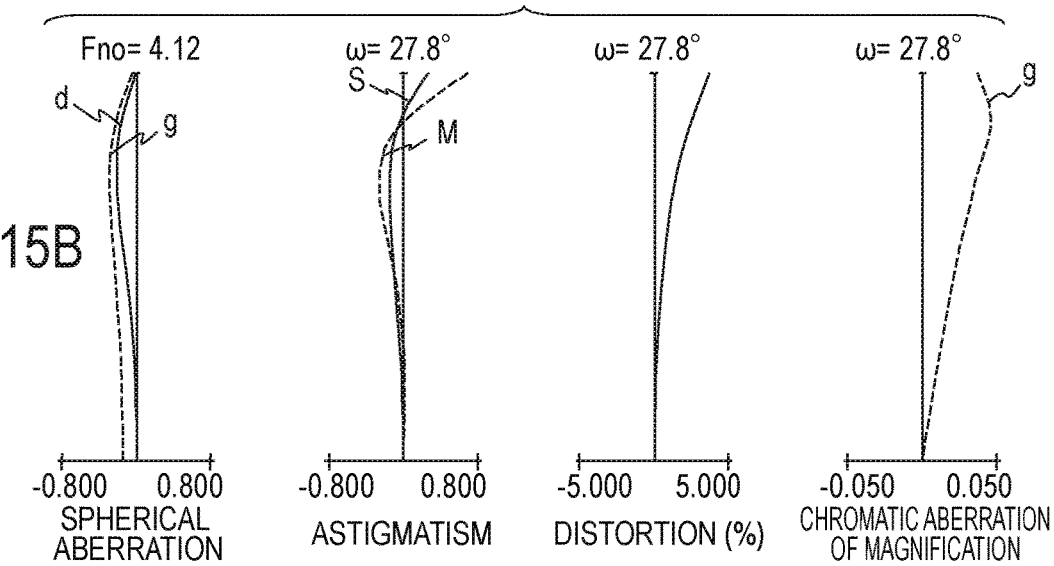
FIG. 15B is a longitudinal aberration diagram of the zoom lens according to Embodiment 5 of the present disclosure at the object distance of minimum object distance (0.2 m) and at the intermediate zoom position.
Figure 15C:
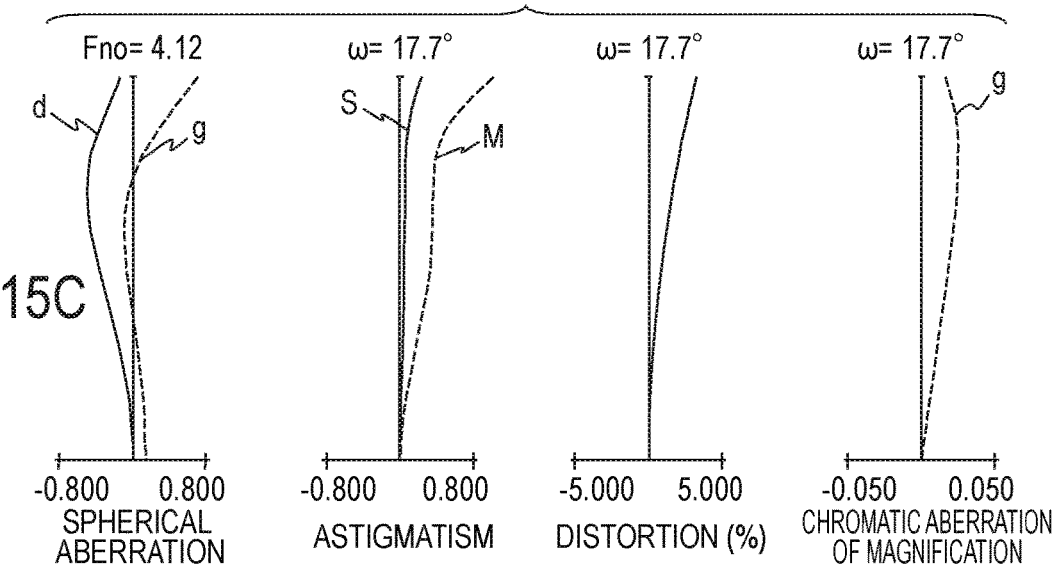
FIG. 15C is a longitudinal aberration diagram of the zoom lens according to Embodiment 5 of the present disclosure at the object distance of minimum object distance (0.2 m) and at the telephoto end.
Figure 16:
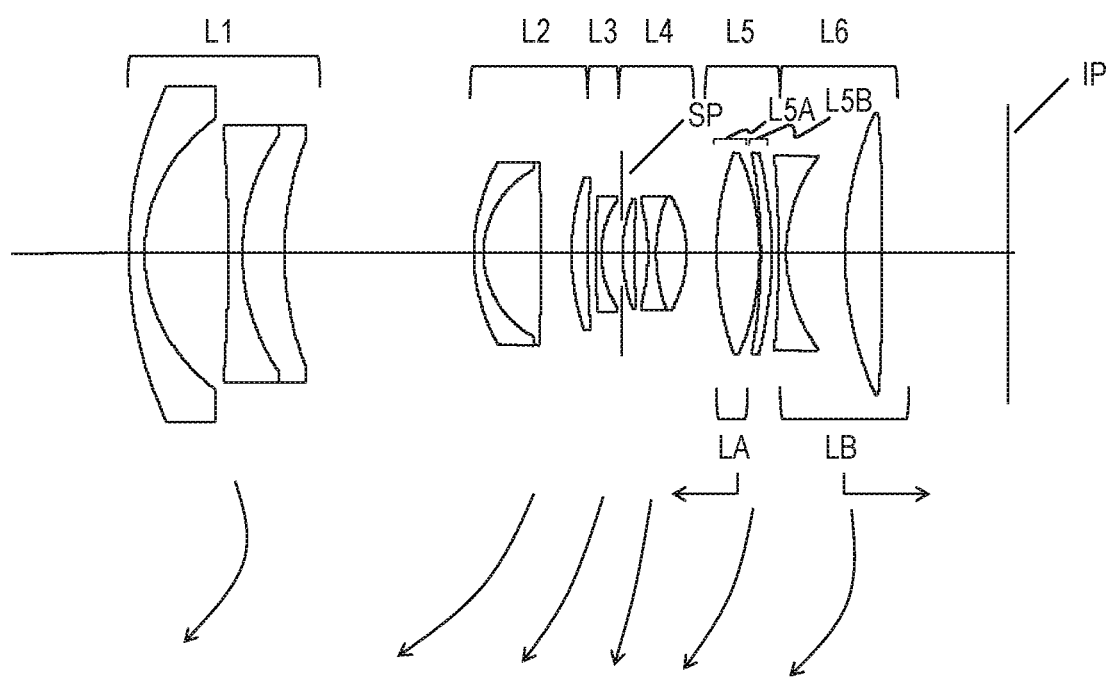
FIG. 16 is a lens cross-sectional view of a zoom lens according to Embodiment 6 of the present disclosure.
Figure 17A:
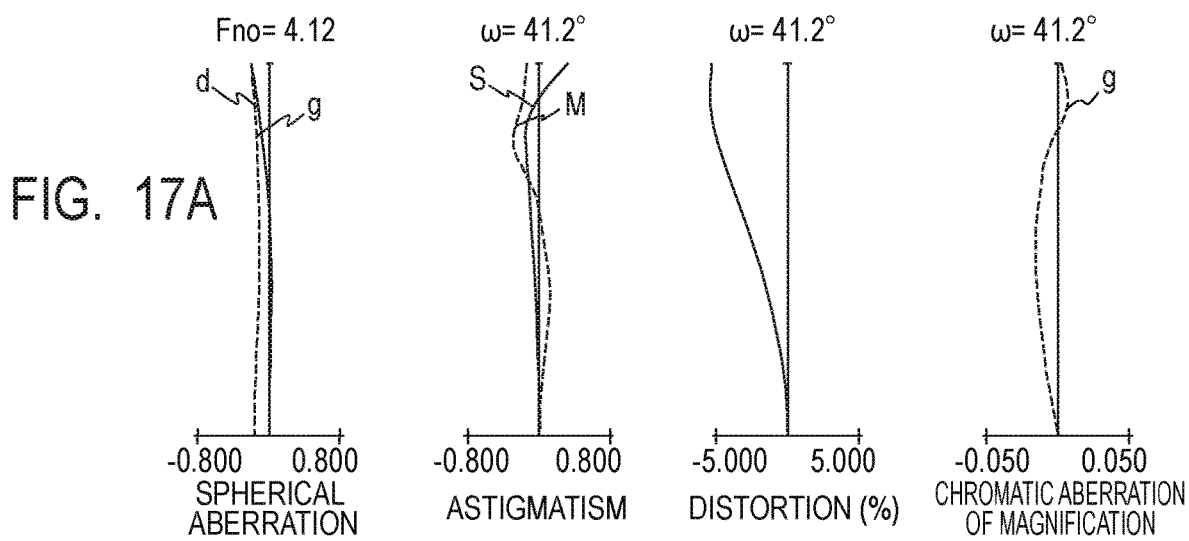
FIG. 17A is a longitudinal aberration diagram of the zoom lens according to Embodiment 6 of the present disclosure at an object distance of infinity and at a wide-angle end.
Figure 17B:
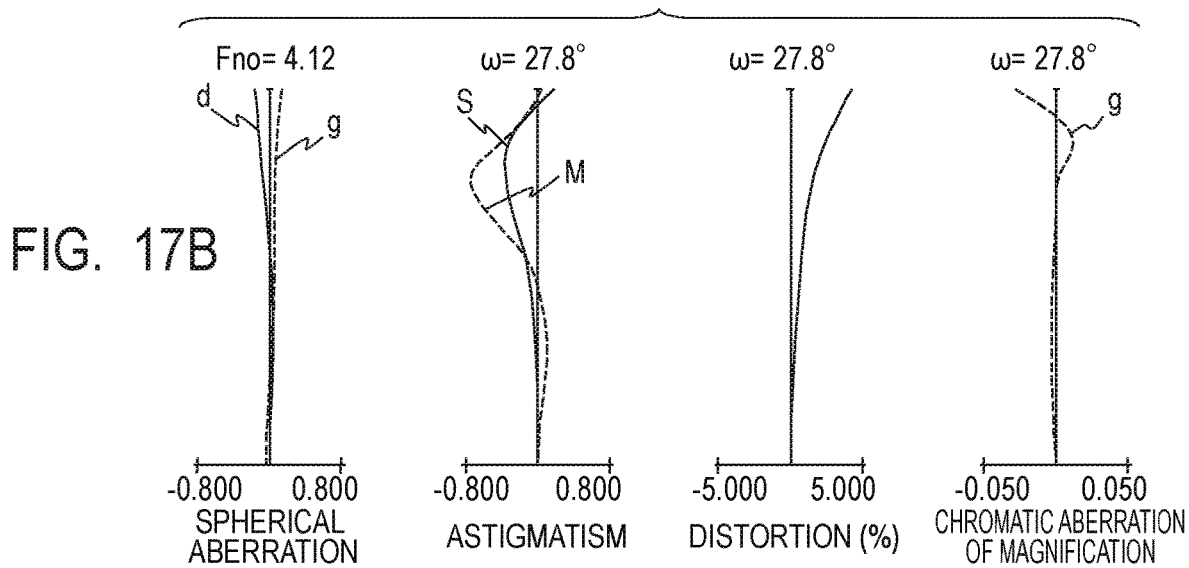
FIG. 17B is a longitudinal aberration diagram of the zoom lens according to Embodiment 6 of the present disclosure at the object distance of infinity and at an intermediate zoom position.
Figure 17C:
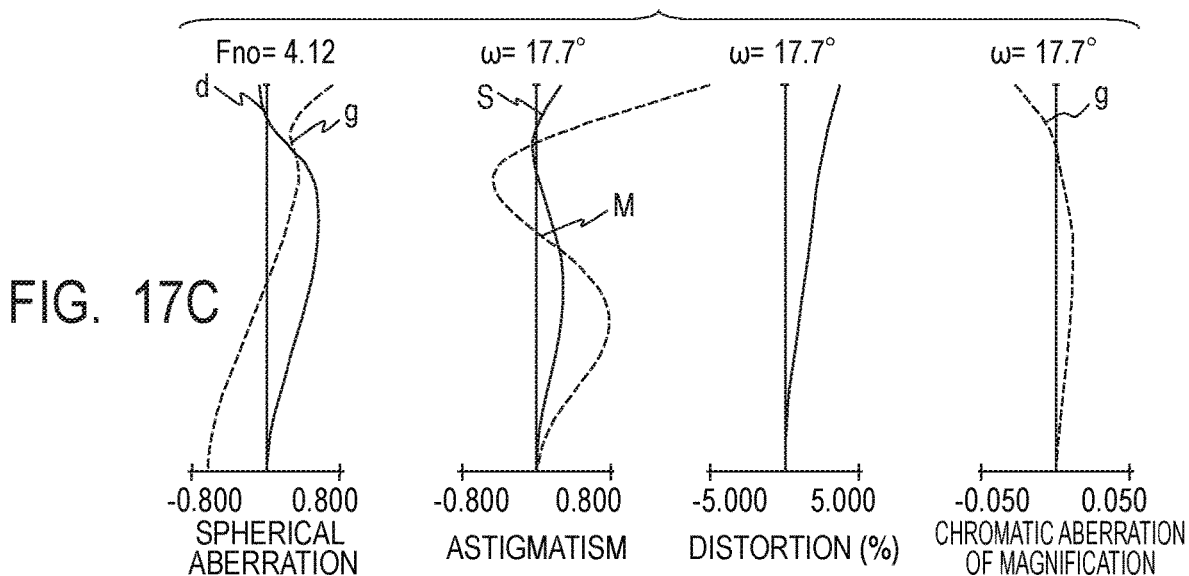
FIG. 17C is a longitudinal aberration diagram of the zoom lens according to Embodiment 6 of the present disclosure at the object distance of infinity and at a telephoto end.
Figure 18A:
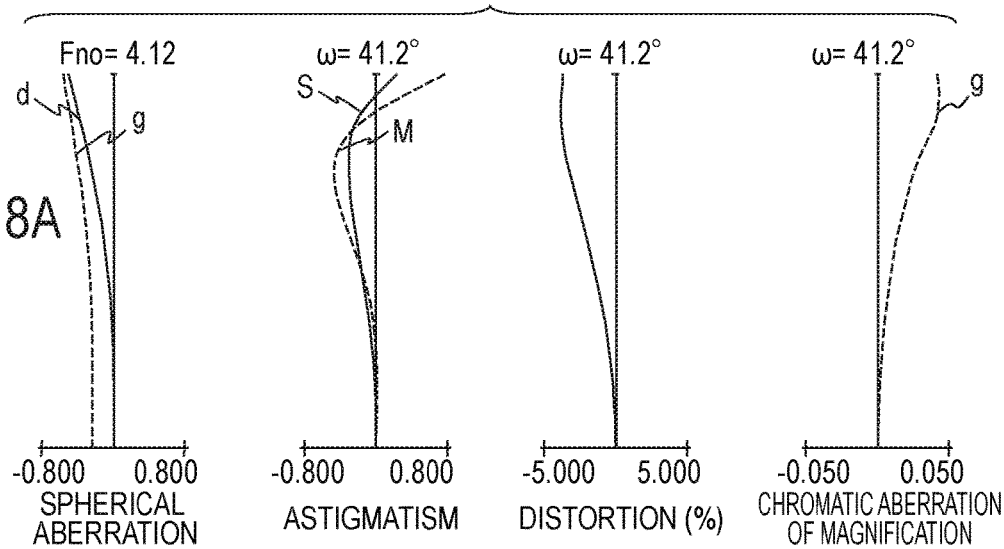
FIG. 18A is a longitudinal aberration diagram of the zoom lens according to Embodiment 6 of the present disclosure at an object distance of minimum object distance (0.2 m) and at the wide-angle end.
Figure 18B:
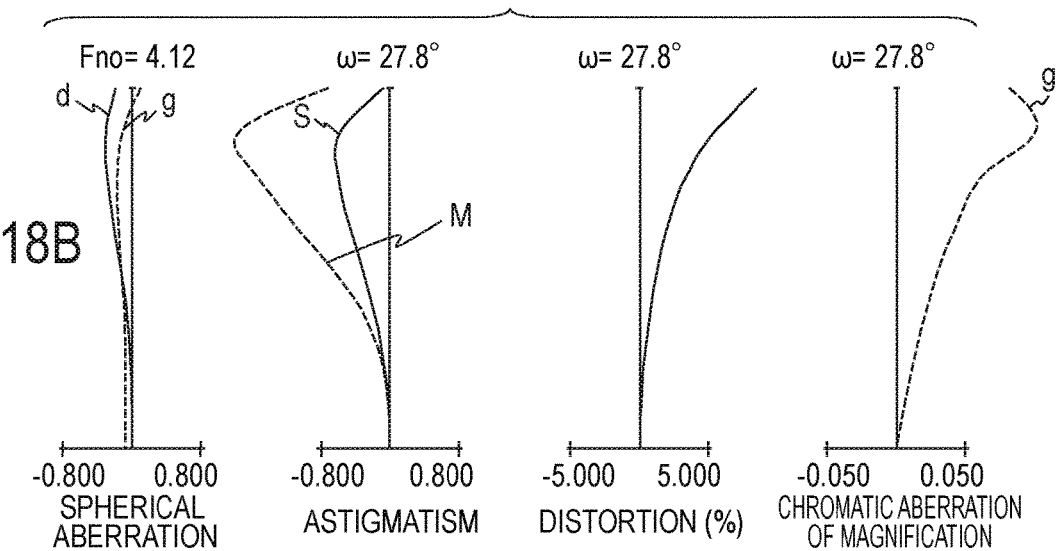
FIG. 18B is a longitudinal aberration diagram of the zoom lens according to Embodiment 6 of the present disclosure at the object distance of minimum object distance (0.2 m) and at the intermediate zoom position.
Figure 18C:
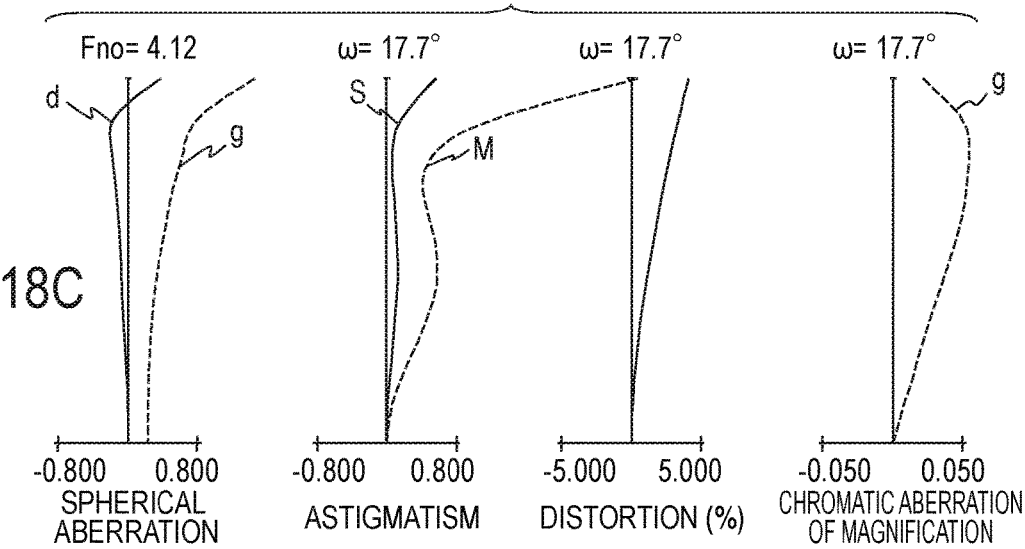
FIG. 18C is a longitudinal aberration diagram of the zoom lens according to Embodiment 6 of the present disclosure at the object distance of minimum object distance (0.2 m) and at the telephoto end.

Now, exemplary embodiments of the present disclosure are described with reference to the accompanying drawings.

A zoom lens according to each of Embodiments of the present disclosure includes a plurality of lens units, in which an interval between each pair of adjacent lens units is changed during zooming. The zoom lens includes, in order from an object side to an image side, a first lens unit having a negative refractive power, a first lens subunit having a positive refractive power, and a second lens subunit having a negative refractive power. During focusing from infinity to minimum object distance (proximity), the first lens subunit is configured to move toward the object side, and the second lens subunit is configured to move toward the image side.

FIGS. 1, 4, 7, 10, 13, and 16 are lens cross-sectional views of zoom lenses according to Embodiments 1 to 6 of the present disclosure, respectively. FIGS. 2A to 2C, 5A to 5C, 8A to 8C, 11A to 11C, 14A to 14C, and 17A to 17C are longitudinal aberration diagrams of the zoom lenses according to Embodiments 1 to 6 of the present disclosure at an object distance of infinity, respectively. Further, FIGS. 3A to 3C, 6A to 6C, 9A to 9C, 12A to 12C, 15A to 15C, and 18A to 18C are longitudinal aberration diagrams of the zoom lenses according to Embodiments 1 to 6 of the present disclosure at an object distance of minimum object distance, respectively. The close distance is different for each of Embodiments, and when Numerical Embodiments to be described later are expressed in units of mm, the close distance is 0.2 m from an image plane in Embodiments 1, 2, 5, and 6, is 0.22 m from an image plane in Embodiment 3, and is 0.25 m from an image plane in Embodiment 4.

In each of Embodiments, the above-mentioned close distance is designed as the shortest image pickup distance. Being in focus (when in focus) at minimum object distance refers to focusing on the above-mentioned close distance. In the longitudinal aberration diagrams, A, B, and C suffixed to the figure numbers refer to longitudinal aberration diagrams at a wide-angle end, an intermediate zoom position, and a telephoto end, respectively. The intermediate zoom position is set to a zoom position at a focal length of $(fw \times ft)^{1/2}$, where "fw" is a focal length at the wide-angle end, and "ft" is a focal length at the telephoto end.

In the lens cross-sectional views, the left side is an object side, and the right side is an image side. When "i" is the order of a lens unit as counted from the object side, Li (i=1, 2, 3, . . . ) denotes the i-th lens unit. The arrows illustrated below the lens units indicate loci of zoom cams of the lens units during zooming from the wide-angle end to the telephoto end. An aperture stop is denoted by SP, and an image plane is denoted by IP.

Lens subunits LA and LB are involved in focusing in a floating system. A first lens subunit LA and a second lens subunit LB are illustrated as the lens subunit LA and the lens subunit LB, respectively. The arrows indicate movement directions of the first lens subunit LA and the second lens subunit LB when the object distance is focused from infinity to minimum object distance. When the zoom lens is used with a video camera or a digital still camera, the image plane IP corresponds to an image pickup surface of an image pickup element (photoelectric conversion element), for example, a CCD sensor or a CMOS sensor.

In the longitudinal aberration diagrams, spherical aberration (mm), astigmatism (mm), distortion (%), and chromatic aberration of magnification (mm) are illustrated. The d-line (wavelength: 587.6 mm) and the g-line (wavelength: 435.8 mm) are aberration diagrams at the wavelengths. ΔM and ΔS indicate a meridional image plane and a sagittal image plane of the d-line, respectively. An f-number is represented by Fno, and an image pickup half angle of view of a paraxial ray is represented by "ω".

The zoom lens according to each of Embodiments of the present disclosure include, in order from the object side to the image side, a first lens unit having a negative refractive power (power; reciprocal of a focal length), a first lens subunit LA having a positive refractive power, and a second lens subunit LB having a negative refractive power. During focusing from infinity to minimum object distance at any zoom position, the first lens subunit LA is configured to move toward the object side, and the second lens subunit LB is configured to move toward the image side.

A movement amount of the first lens subunit LA during focusing from infinity to minimum object distance at a telephoto end is represented by mA, a movement amount of the second lens subunit LB during focusing from infinity to minimum object distance at the telephoto end is represented by mB, and a focal length of the zoom lens at the telephoto end is represented by "ft". The movement amounts mA and mB each have a positive sign when being a movement amount from the object side to the image side. At this time, the following inequality is satisfied.

$$0.20 < (mB - mA)/ft < 1.00 \qquad (1)$$

In the zoom lens according to each of Embodiments, the first lens unit L1 closest to the object side has the negative refractive power, and a plurality of lens units are provided on the image side of the first lens unit L1. Then, an interval between each pair of adjacent lens units is changed during zooming. As a result, a zoom lens having satisfactory optical performance over the entire zoom range from the wide-angle end to the telephoto end can be obtained easily.

Further, the two lens subunits, that is, the first lens subunit LA and the second lens subunit LB are moved during focusing from infinity to minimum object distance. Those lens subunits are arranged on the image side of the aperture stop SP. With this configuration, focusing is performed by lens units other than the first lens unit L1, and an image is taken easily with no change in total length of the zoom lens even when the image is taken at minimum object distance. Further, the lens subunits having relatively small effective lens diameters and small weights are used for focusing, to thereby enable easy driving for focusing.

The zoom lens further includes, in order from the object side to the image side, the first lens subunit LA having the positive refractive power, and the second lens subunit LB having the negative refractive power. As a result, a ray entering the first lens subunit LA from the object side is allowed to enter the second lens subunit LB without being diverged significantly. Consequently, an effective diameter of the second lens subunit LB arranged on the image side is reduced.

Further, with the first lens subunit LA and the second lens subunit LB being moved along different loci for focusing, the zoom lens is focused at a closer distance to increase a maximum image pickup magnification, and suppress variations in aberrations. In particular, with the first lens subunit LA being moved toward the object side and the second lens subunit LB being moved toward the image side at any zoom position of the zoom lens, significant effects are obtained.

The inequality (1) relates to movement amounts of the first lens subunit LA and the second lens subunit LB during focusing from infinity to minimum object distance at the telephoto end. When the value of the inequality (1) falls below the lower limit value thereof, the movement amounts of the lens subunits during focusing become much smaller, with the result that the close distance becomes disadvantageously longer, and that the maximum image pickup magnification becomes disadvantageously smaller. In contrast, when the value of the inequality (1) exceeds the upper limit value thereof, the movement amounts of the lens subunits during focusing become much larger to disadvantageously interfere with adjacent lens units.

In one embodiment, the inequality (1) is set as follows.

$$0.205 < (mB - mA)/ft < 0.900 \qquad (1a)$$

In one embodiment, the inequality (1a) is set as follows.

$$0.208 < (mB - mA)/ft < 0.800 \qquad (1b)$$

In each of Embodiments, with the above-mentioned configuration, a zoom lens with a reduced close distance over the entire zoom range from the wide-angle end to the telephoto end and a higher image pickup magnification is obtained.

In each of Embodiments, one or more of the following inequalities is satisfied.

A focal length of the first lens subunit LA is represented by fA, and a focal length of the second lens subunit LB is represented by fB. A focus sensitivity at infinity of the first lens subunit LA when an image is taken at minimum object distance and at a zoom position with a highest image pickup magnification is represented by γA. A focus sensitivity at infinity of the second lens subunit LB when an image is taken at minimum object distance and at the zoom position with the highest image pickup magnification is represented by γB.

At this time, one or more of the following inequalities is satisfied.

$$0.10 < |fA/fB| < 1.20 \quad (2)$$

$$0.30 < fA/ft < 1.00 \quad (3)$$

$$0.10 < |mA/ft| < 0.50 \quad (4)$$

$$0.50 < |mA/mB| < 2.00 \quad (5)$$

$$2.50 < |\gamma A| < 6.00 \quad (6)$$

$$0.10 < |\gamma A \times mA/ft| < 3.00 \quad (7)$$

$$0.20 < |(\gamma A \times mA)/(\gamma B \times mB)| < 5.00 \quad (8)$$

Next, the technical meaning of each of the inequalities given above is described.

The inequality (2) relates to a ratio between the focal length of the first lens subunit LA and the focal length of the second lens subunit LB. When the ratio of the inequality (2) falls below the lower limit value thereof or exceeds the upper limit value thereof, a refractive power (power) of one lens subunit becomes much smaller, and an amount of effect on a variation in focus position during focusing becomes much smaller. Then, it becomes difficult to focus at substantially close distance.

The inequality (3) relates to the focal length of the first lens subunit LA. When the value of the inequality (3) falls below the lower limit value thereof, the positive refractive power of the first lens subunit LA becomes much smaller, and an amount of effect on the variation in focus position during focusing becomes much smaller. Then, it becomes difficult to focus at substantially close distance. In contrast, when the value of the inequality (3) exceeds the upper limit value thereof, the refractive power of the first lens subunit LA becomes much stronger, with the result that larger amounts of various aberrations are disadvantageously generated, and at the same time, variations in aberrations during focusing from infinity to minimum object distance also become disadvantageously much larger.

The inequality (4) relates to the movement amount of the first lens subunit LA during focusing. When the value of the inequality (4) falls below the lower limit value thereof, the movement amount of the first lens subunit LA during focusing is too small, and it becomes difficult to reduce the close distance. In contrast, when the value of the inequality (4) exceeds the upper limit value thereof, the movement amount of the first lens subunit LA during focusing becomes much larger to disadvantageously interfere with an adjacent lens unit.

The inequality (5) relates to a ratio between the movement amounts of the first lens subunit LA and the second lens subunit LB during focusing. The first lens subunit LA has the positive refractive power, and the second lens subunit LB has the negative refractive power. When the ratio of the inequality (5) falls below the lower limit value thereof or exceeds the upper limit value thereof, a movement amount of one lens subunit becomes much larger during focusing, and the effects of canceling variations in aberrations between the first lens subunit LA having the positive refractive power and the second lens subunit LB having the negative refractive power become unbalanced. Therefore, the variations in aberrations during focusing from infinity to minimum object distance become disadvantageously larger.

When the zoom lens consists of the following lens units: the first lens unit to the k-th lens unit, a focus sensitivity "$\gamma_v$" of the v-th lens unit at an object distance of infinity can be calculated by the following expression:

$$\gamma_v = (1 - \beta_v^2) \times \beta_{v+1}^2 \times \beta_{v+2}^2 \times \ldots \times \beta_{k+1}^2,$$

where βi is a lateral magnification of the i-th lens unit.

The inequality (6) relates to the focus sensitivity of the first lens subunit LA. A "focus sensitivity" as used herein specifically refers to an amount in mm by which a focus plane is moved toward the image side when the corresponding lens subunit is moved in an optical axis direction toward the image side by 1 mm. When the value of the inequality (6) falls below the lower limit value thereof, the first lens subunit LA is moved significantly so as to focus at minimum object distance. At this time, the first lens subunit LA disadvantageously interferes with an adjacent lens unit. In contrast, when the value of the inequality (6) exceeds the upper limit value thereof, the focus sensitivity becomes much higher, and the optical performance varies significantly and disadvantageously with respect to a manufacturing error.

In the inequality (7), a variation in focus position of the first lens subunit LA during focusing from infinity to minimum object distance is estimated. Here, the meaning of the inequality (7) is described. The focus sensitivity γA of the first lens subunit LA (at the object distance of infinity) is an amount indicating how much the focus plane is moved toward the image side in mm when the first lens subunit LA is moved toward the image side by 1 mm. Through multiplication of the focus sensitivity γA by the movement amount mA of the first lens subunit LA during focusing, the variation in focus position of the first lens subunit LA can be estimated.

When the value of the inequality (7) falls below the lower limit value thereof, the variation in focus position of the first lens subunit LA becomes much smaller, and it becomes difficult to reduce the close distance. In contrast, when the value of the inequality (7) exceeds the upper limit value thereof, the variation in focus position becomes larger than required, and hence variations in aberrations during focusing from infinity to minimum object distance become disadvantageously much larger.

In the inequality (8), a contribution ratio of the first lens subunit LA and the second lens subunit LB on a variation in focus position during focusing from infinity to minimum object distance is estimated. The meaning of the inequality (8) is described. As described in the description of the inequality (7), through multiplication of the focus sensitivity by the movement amount during focusing from infinity to minimum object distance, the variation in focus position of the lens subunit can be estimated.

In the inequality (8), through taking a ratio between the amounts of the first lens subunit LA and the second lens subunit LB, the contribution ratio of the lens subunits on the variation in focus position during focusing from infinity to minimum object distance can be estimated. When the ratio of the inequality (8) falls below the lower limit value thereof or exceeds the upper limit value thereof, only one of the first lens subunit LA and the second lens subunit LB is configured to contribute to the variation in focus position, and it becomes difficult to focus on the reduced close distance and obtain the increased maximum image pickup magnification.

In one embodiment, the inequalities (2) to (8) are set as follows.

$$0.10 < |fA/fB| < 0.80 \quad (2a)$$

$$0.30 < fA/ft < 0.80 \quad (3a)$$

$$0.10 < |mA/ft| < 0.40 \quad (4a)$$

$$0.70 < |mA/mB| < 2.00 \quad (5a)$$

$$2.50 < |\gamma A| < 5.50 \quad (6a)$$

$$0.20 < |\gamma A \times mA/ft| < 3.00 \quad (7a)$$

$$0.50 < |(\gamma A \times mA)/(\gamma B \times mB)| < 5.00 \quad (8a)$$

Furthermore, in one embodiment, the inequalities (2a) to (8a) are set as follows.

$$0.20 < |fA/fB| < 0.70 \quad (2b)$$

$$0.40 < fA/ft < 0.70 \quad (3b)$$

$$0.10 < |mA/ft| < 0.30 \quad (4b)$$

$$0.75 < |mA/mB| < 1.80 \quad (5b)$$

$$2.50 < |\gamma A| < 5.00 \quad (6b)$$

$$0.30 < |\gamma A \times mA/ft| < 2.00 \quad (7b)$$

$$0.80 < |(\gamma A \times mA)/(\gamma B \times mB)| < 4.00 \quad (8b)$$

In each of Embodiments, the zoom lens includes the aperture stop SP. Further, both of the first lens subunit LA and the second lens subunit LB are to be arranged on the image side of the aperture stop SP. With this configuration, particularly at the telephoto end when the object distance is focused at infinity, sufficiently large air intervals can be secured on the object side of the first lens subunit LA and on the image side of the second lens subunit LB. As a result, it becomes easy to secure movement distances during focusing from infinity to minimum object distance, and the close distance can be reduced.

In one embodiment, the second lens subunit LB is positioned adjacent to, and on the image side of, the first lens subunit LA. When focusing is performed by the floating system, the first lens subunit LA and the second lens subunit LB along different loci are moved, and mechanical configurations become complicated. When the first lens subunit LA and the second lens subunit LB are adjacent to each other with only an air interval interposed therebetween, there can be adopted a configuration in which different mechanical mechanisms are not arranged at separate positions for focusing, and the mechanical mechanisms become relatively and advantageously simpler.

Next, a lens configuration of the lens units in each of Embodiments is described.

The zoom lens according to each of Embodiments 1 to 5 has a lens configuration consisting of the following lens units in order from the object side to the image side: a first lens unit L1 having a negative refractive power, a second lens unit L2 having a positive refractive power, a third lens unit L3 having a negative refractive power, a fourth lens unit L4 having a positive refractive power, a fifth lens unit L5 having a positive refractive power, and a sixth lens unit L6 having a negative refractive power. The aperture stop SP is arranged in the fourth lens unit L4. As the lens subunits configured to move during focusing, the entire fifth lens unit L5 corresponds to the first lens subunit LA, and the entire sixth lens unit L6 corresponds to the second lens subunit LB.

The first lens unit L1 consists of a first lens having a negative refractive power, and a cemented lens formed by cementing a second lens having a negative refractive power and a third lens having a positive refractive power. The second lens unit L2 consists of a cemented lens formed by cementing a first lens having a negative refractive power and a second lens having a positive refractive power, and a third lens having a positive refractive power. The third lens unit L3 consists of a first lens having a negative refractive power, and a second lens having a positive refractive power.

A lens surface on the image side of the first lens is aspherical. The fourth lens unit L4 consists of the aperture stop SP, a first lens having a positive refractive power, and a cemented lens formed by cementing a second lens having a negative refractive power and a third lens having a positive refractive power. The fifth lens unit L5 consists of a first lens having a positive refractive power. The sixth lens unit L6 consists of a first lens having a negative refractive power, and a second lens having a positive refractive power. A surface on the image side of the second lens is aspherical.

The inequalities (1) to (8) are satisfied, to thereby obtain a zoom lens with which the close distance is reduced over the entire zoom range from the wide-angle end to the telephoto end to increase the maximum image pickup magnification. Further, both of the first lens subunit LA and the second lens subunit LB are arranged on the image side of the aperture stop SP. With this configuration, high optical performance is obtained during focusing at minimum object distance. Further, the first lens subunit LA and the second lens subunit LB are arranged to be adjacent to each other with only an air interval interposed therebetween. With this configuration, the mechanical mechanisms is relatively simplified.

The zoom lens according to Embodiment 6 has a lens configuration consisting of the following lens units in order from the object side to the image side: a first lens unit L1 having a negative refractive power, a second lens unit L2 having a positive refractive power, a third lens unit L3 having a negative refractive power, a fourth lens unit L4 having a positive refractive power, a fifth lens unit L5 having a positive refractive power, and a sixth lens unit L6 having a negative refractive power.

The aperture stop SP is arranged in the fourth lens unit L4. The fifth lens unit L5 having the positive refractive power consists of a 5A lens subunit L5A having a positive refractive power and a 5B lens subunit (third lens subunit) L5B having a positive refractive power. As the lens subunits to be driven during focusing, the 5A lens subunit L5A corresponds to the first lens subunit LA, and the entire sixth lens unit L6 corresponds to the second lens subunit LB.

The first lens unit L1 consists of a first lens having a negative refractive power, and a cemented lens formed by cementing a second lens having a negative refractive power and a third lens having a positive refractive power. The second lens unit L2 consists of a cemented lens formed by cementing a first lens having a negative refractive power and a second lens having a positive refractive power, and a third lens having a positive refractive power. The third lens unit L3 consists of a first lens having a negative refractive power. A lens surface on the image side of the first lens is aspherical.

The fourth lens unit L4 consists of the aperture stop SP, a first lens having a positive refractive power, and a cemented lens formed by cementing a second lens having a negative refractive power and a third lens having a positive refractive power. A lens surface on the object side of the second lens is aspherical. The fifth lens unit L5 consists of a first lens having a positive refractive power, and a second lens having a positive refractive power. The first lens corresponds to the 5A lens subunit L5A, and the second lens corresponds to the 5B lens subunit L5B. The sixth lens unit L6 consists of a first lens having a negative refractive power, and a second lens having a positive refractive power. A lens surface on the image side of the second lens is aspherical.

The inequalities (1) to (8) are satisfied, to thereby obtain a zoom lens with which the close distance is reduced over the entire zoom range from the wide-angle end to the telephoto end to increase the maximum image pickup magnification. Further, both of the first lens subunit LA and the second lens subunit LB are arranged on the image side of the aperture stop SP. With this configuration, high optical performance is obtained during focusing at minimum object distance.

In Embodiment 1, the object distance of minimum object distance is at 0.2 m (when Numerical Embodiments to be described later are expressed in units of mm; the same applies hereinafter) from the image plane in the entire zoom range. Moreover, when the zoom lens is focused at the close distance at the telephoto end, the maximum image pickup magnification is −1.0.

In each of Embodiments 2, 5, and 6, the object distance of minimum object distance and the maximum image pickup magnification are the same as in Embodiment 1.

In Embodiment 3, the object distance of minimum object distance is at 0.22 m from the image plane in the entire zoom range. Moreover, when the zoom lens is focused at the close distance at the telephoto end, the maximum image pickup magnification is −0.7.

In Embodiment 4, the object distance of minimum object distance is at 0.25 m from the image plane in the entire zoom range. Moreover, when the zoom lens is focused at the close distance at the telephoto end, the maximum image pickup magnification is −0.5.

Figure 19:
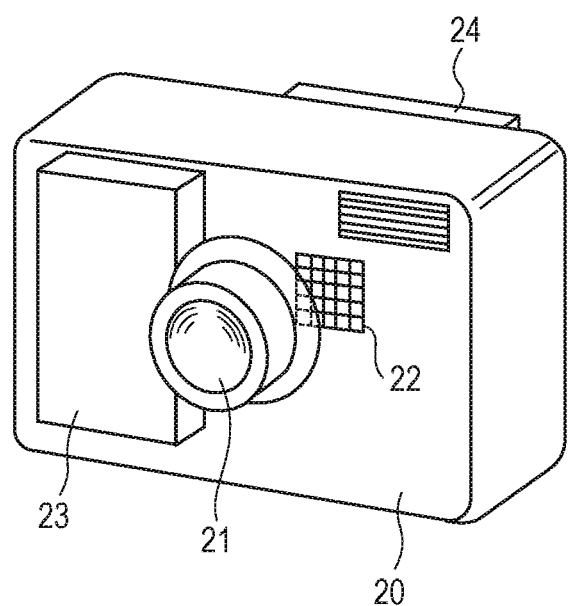
FIG. 19 is a schematic view of a main part of an image pickup apparatus according to an Embodiment of the present disclosure.

Next, a digital camera (optical apparatus) according to an embodiment of the present disclosure, which uses the zoom lens according to each of Embodiments of the present disclosure as an image pickup optical system, is described with reference to FIG. 19. In FIG. 19, a digital camera main body 20 includes an image pickup optical system 21 formed of the zoom lens according to each of Embodiments described above, an image pickup element 22, for example, a CCD, configured to receive an object image formed by the image pickup optical system 21, a storage unit 23 configured to store the object image received by the image pickup element 22, and a viewfinder 24 to be used to observe the object image displayed on a display element (not shown).

The above-mentioned display element is formed of a liquid crystal panel, for example, and is configured to display the object image formed on the image pickup element 22. The viewfinder 24 may be a liquid crystal display panel having an equivalent function.

Through adopting the zoom lens according to each of Embodiments of the present disclosure to an image pickup apparatus, for example, a digital camera, as described above, an image pickup apparatus having a small size and high optical performance is achieved.

Next, Numerical Embodiments 1 to 6 of Embodiments 1 to 6 of the present disclosure are described.

In each of Numerical Embodiments, "ri" represents a curvature radius of the i-th lens surface counted from the object side. An aspherical shape is expressed by the following expression:

$$x=(h^2/r)/[1+\{1-1+K)\times(h/r)^2\}^{1/2}]+A4\times h^4+A6\times h^6+A8\times h^8+A10\times h^{10},$$

where "x" is a displacement amount from a surface vertex in the optical axis direction, "h" is a height from an optical axis in a direction perpendicular to the optical axis, "r" is a paraxial curvature radius, K is a conic constant, and A4, A6, A8, and A10 are aspherical coefficients. In the following numerical values, "e±XX" means "×10$^{\pm XX}$".

A lens thickness or an air interval between the i-th surface and the (i+1)th surface is represented by "di". For a portion with "di" that is variable depending on the zoom position, values of "di" at the object distance of infinity and the object distance of minimum object distance are provided.

Further, "ndi" and "vdi" are a refractive index and an Abbe number of a material of a lens between the i-th surface and the (i+1)th surface with respect to the d-line. An effective diameter (mm) of each lens surface is also provided.

Further, as specifications of the zoom lens, a zoom ratio, a focal length (mm), an f-number, an image pickup angle of view (deg), an image height (mm), a total length (mm) of the zoom lens, a BF (mm), and an aperture diameter (mm) are provided. An "image pickup angle of view" as used herein is a half angle of view of a paraxial ray, and is expressed in degree. The total length of the zoom lens is a distance on the optical axis from the first lens surface closest to the object side to the image plane. A BF is a distance on the optical axis from the last lens surface closest to the image side to the image plane. When an aperture diameter is different depending on the zoom position, values at respective states are provided.

In addition to the above items, as data of the lens units of the zoom lens, the lens unit number, a start surface (first surface) of the lens unit, and a focal length of the lens unit are provided.

A relationship between each of the inequalities given above and each of Embodiments is shown in Table 1.

Numerical Embodiment 1

| | | | | | |
|---|---|---|---|---|---|
| Unit: mm | | | | | |
| Surface data | | | | | |
| Surface number | r | d | nd | vd | Effective diameter |
| 1 | 68.266 | 2.39 | 1.64000 | 60.1 | 55.37 |
| 2 | 29.107 | 9.86 | | | 45.13 |
| 3 | 264.535 | 2.00 | 1.74100 | 52.6 | 45.04 |
| 4 | 32.810 | 3.47 | 1.80810 | 22.8 | 40.41 |
| 5 | 46.340 | (Variable) | | | 39.80 |
| 6 | 25.785 | 1.42 | 1.87400 | 35.3 | 26.34 |

-continued

| Unit: mm | | | | | |
|---|---|---|---|---|---|
| 7 | 14.338 | 8.10 | 1.81600 | 46.6 | 23.83 |
| 8 | 1,007.907 | 0.10 | | | 22.85 |
| 9 | 30.438 | 1.96 | 1.85150 | 40.8 | 20.92 |
| 10 | 74.386 | (Variable) | | | 20.24 |
| 11 | 132.839 | 1.02 | 1.62004 | 36.3 | 14.97 |
| 12* | 10.991 | 0.96 | | | 13.80 |
| 13 | 11.082 | 1.41 | 1.59270 | 35.3 | 14.38 |
| 14 | 13.218 | (Variable) | | | 14.11 |
| 15 (Stop) | ∞ | 0.10 | | | (Variable) |
| 16 | 23.347 | 1.99 | 1.43875 | 94.9 | 15.98 |
| 17 | 144.378 | 6.81 | | | 15.92 |
| 18 | −32.719 | 1.12 | 1.74100 | 52.6 | 16.21 |
| 19 | 30.669 | 5.87 | 1.43875 | 94.9 | 18.23 |
| 20 | −16.279 | (Variable) | | | 19.39 |
| 21 | 40.424 | 6.49 | 1.59522 | 67.7 | 33.14 |
| 22 | −79.771 | (Variable) | | | 33.19 |
| 23 | 133.562 | 1.09 | 1.73400 | 51.5 | 31.82 |
| 24 | 24.165 | 8.11 | | | 30.61 |
| 25 | 56.743 | 4.14 | 1.87400 | 35.3 | 38.14 |
| 26* | 536.125 | (Variable) | | | 38.29 |
| Image plane | ∞ | | | | |

Aspherical surface data

Twelfth surface

K = 0.00000e+000 A4 = 1.82796e−005 A6 = −1.00088e−008 A8 = 3.63703e−009

Twenty-sixth surface

K = 0.00000e+000 A4 = −9.86288e−007 A6 = −7.24709e−009 A8 = 1.51800e−011
A10 = −2.49306e−014

Various data

Zoom ratio 2.75

| | | | |
|---|---|---|---|
| Focal length | 24.73 | 40.97 | 67.90 |
| F-number | 4.12 | 4.12 | 4.12 |
| Half angle of view (degrees) | 41.19 | 27.84 | 17.67 |
| Image height | 21.64 | 21.64 | 21.64 |
| Total lens length | 145.62 | 138.11 | 159.46 |
| BF | 18.00 | 23.52 | 49.52 |
| Aperture diameter | 10.23 | 12.32 | 15.68 |
| Object distance being infinity | | | |
| d5 | 47.21 | 20.08 | 1.87 |
| d10 | 2.31 | 3.62 | 7.27 |
| d14 | 3.04 | 4.66 | 9.73 |
| d20 | 5.66 | 13.51 | 20.32 |
| d22 | 1.00 | 4.31 | 2.35 |
| d26 | 18.00 | 23.52 | 49.52 |
| Object distance being minimum object distance | | | |
| d5 | 47.21 | 20.08 | 1.87 |
| d10 | 2.31 | 3.62 | 7.27 |
| d14 | 3.04 | 4.66 | 9.73 |
| d20 | 1.00 | 5.01 | 1.00 |
| d22 | 5.66 | 15.57 | 33.39 |
| d26 | 18.00 | 20.76 | 37.81 |

Lens unit data

| Unit | First surface | Focal length |
|---|---|---|
| 1 | 1 | −37.51 |
| 2 | 6 | 22.85 |
| 3 | 11 | −23.61 |
| 4 | 15 | 80.49 |
| 5 | 21 | 46.00 |
| 6 | 23 | −120.42 |

Numerical Embodiment 2

| Unit: mm | | | | | |
|---|---|---|---|---|---|
| Surface data | | | | | |
| Surface number | r | d | nd | vd | Effective diameter |
| 1 | 76.645 | 2.39 | 1.64000 | 60.1 | 55.47 |
| 2 | 28.717 | 10.22 | | | 44.75 |
| 3 | 423.113 | 2.00 | 1.74100 | 52.6 | 44.66 |
| 4 | 34.659 | 3.50 | 1.80810 | 22.8 | 40.66 |
| 5 | 50.547 | (Variable) | | | 40.10 |
| 6 | 25.942 | 1.42 | 1.87400 | 35.3 | 29.26 |
| 7 | 14.491 | 9.97 | 1.81600 | 46.6 | 26.06 |
| 8 | −4,822.593 | 0.10 | | | 25.05 |
| 9 | 30.301 | 2.21 | 1.85150 | 40.8 | 22.59 |
| 10 | 77.491 | (Variable) | | | 21.86 |
| 11 | 117.033 | 1.02 | 1.62004 | 36.3 | 17.27 |
| 12* | 11.396 | 1.82 | | | 14.25 |
| 13 | 11.358 | 1.96 | 1.59270 | 35.3 | 15.32 |
| 14 | 13.083 | (Variable) | | | 14.81 |
| 15 (Stop) | ∞ | 0.10 | | | (Variable) |
| 16 | 24.250 | 2.11 | 1.43875 | 94.9 | 16.74 |
| 17 | 122.582 | 4.83 | | | 16.64 |
| 18 | −30.072 | 1.12 | 1.74100 | 52.6 | 16.32 |
| 19 | 23.538 | 5.49 | 1.43875 | 94.9 | 17.03 |
| 20 | −16.713 | (Variable) | | | 18.22 |
| 21 | 32.338 | 6.16 | 1.59522 | 67.7 | 26.53 |
| 22 | −43.049 | (Variable) | | | 26.66 |
| 23 | 179.566 | 1.09 | 1.73400 | 51.5 | 25.04 |
| 24 | 20.314 | 11.62 | | | 24.34 |
| 25 | 63.289 | 3.94 | 1.87400 | 35.3 | 37.61 |
| 26* | 2,413.714 | (Variable) | | | 37.79 |
| Image plane | ∞ | | | | |

Aspherical surface data

Twelfth surface $K = 0.00000e+000$ $A4 = 1.93243e-005$ $A6 = 6.65834e-008$ $A8 = 3.73615e-009$ Twenty-sixth surface $K = 0.00000e+000$ $A4 = -1.58958e-006$ $A6 = -9.63363e-009$ $A8 = 3.53574e-011$
$A10 = -4.91942e-014$ Various data Zoom ratio 2.75

| | | | |
|---|---|---|---|
| Focal length | 24.73 | 40.97 | 67.90 |
| F-number | 4.12 | 4.12 | 4.12 |
| Half angle of view (degrees) | 41.19 | 27.84 | 17.67 |
| Image height | 21.64 | 21.64 | 21.64 |
| Total lens length | 149.03 | 132.12 | 163.58 |
| BF | 18.00 | 25.16 | 61.16 |
| Aperture diameter | 10.28 | 12.06 | 16.47 |
| Object distance being infinity | | | |
| d5 | 46.99 | 15.48 | 1.48 |
| d10 | 1.46 | 2.84 | 6.13 |
| d14 | 4.43 | 6.04 | 12.07 |
| d20 | 3.97 | 4.01 | 8.68 |
| d22 | 1.12 | 5.52 | 1.00 |
| d26 | 18.00 | 25.16 | 61.16 |
| Object distance being minimum object distance | | | |
| d5 | 46.99 | 15.48 | 1.48 |
| d10 | 1.46 | 2.84 | 6.13 |
| d14 | 4.43 | 6.04 | 12.07 |
| d20 | 1.00 | 1.00 | 1.00 |
| d22 | 4.09 | 13.08 | 17.52 |
| d26 | 18.00 | 20.61 | 52.32 |

-continued

| Unit: mm | | |
|---|---|---|
| Lens unit data | | |
| Unit | First surface | Focal length |
| 1 | 1 | −35.69 |
| 2 | 6 | 22.50 |
| 3 | 11 | −24.37 |
| 4 | 15 | 154.60 |
| 5 | 21 | 32.00 |
| 6 | 23 | −73.77 |

Numerical Embodiment 3

| Unit: mm | | | | | |
|---|---|---|---|---|---|
| Surface data | | | | | |
| Surface number | r | d | nd | vd | Effective diameter |
| 1 | 77.359 | 2.39 | 1.64000 | 60.1 | 58.56 |
| 2 | 30.767 | 10.40 | | | 47.64 |
| 3 | 285.084 | 2.00 | 1.74100 | 52.6 | 47.56 |
| 4 | 36.762 | 3.51 | 1.80810 | 22.8 | 43.14 |
| 5 | 52.769 | (Variable) | | | 42.56 |
| 6 | 25.831 | 1.42 | 1.87400 | 35.3 | 27.06 |
| 7 | 14.169 | 8.63 | 1.81600 | 46.6 | 24.26 |
| 8 | 3,952.518 | 0.10 | | | 23.24 |
| 9 | 30.326 | 2.01 | 1.85150 | 40.8 | 21.00 |
| 10 | 75.181 | (Variable) | | | 20.24 |
| 11 | 202.570 | 1.02 | 1.62004 | 36.3 | 14.86 |
| 12* | 11.045 | 1.12 | | | 13.66 |
| 13 | 11.000 | 1.48 | 1.59270 | 35.3 | 14.28 |
| 14 | 12.979 | (Variable) | | | 13.96 |
| 15 (Stop) | ∞ | 0.10 | | | (Variable) |
| 16 | 24.203 | 1.85 | 1.43875 | 94.9 | 15.44 |
| 17 | 137.283 | 5.98 | | | 15.37 |
| 18 | −30.574 | 1.12 | 1.74100 | 52.6 | 15.38 |
| 19 | 29.198 | 5.47 | 1.43875 | 94.9 | 17.47 |
| 20 | −16.246 | (Variable) | | | 18.62 |
| 21 | 36.901 | 6.18 | 1.59522 | 67.7 | 28.84 |
| 22 | −52.234 | (Variable) | | | 28.96 |
| 23 | 203.727 | 1.09 | 1.73400 | 51.5 | 27.76 |
| 24 | 22.384 | 9.36 | | | 26.95 |
| 25 | 63.709 | 4.11 | 1.87400 | 35.3 | 37.37 |
| 26* | −2,197.910 | (Variable) | | | 37.59 |
| Image plane | ∞ | | | | |

Aspherical surface data

Twelfth surface

K = 0.00000e+000 A4 = 1.97196e−005 A6 = 4.95856e−008 A8 = 3.20810e−009
Twenty-sixth surface K = 0.00000e+000 A4 = −1.39002e−006 A6 = −1.04818e−008 A8 = 2.85882e−011
A10 = −4.23704e−014

| Various data | | | |
|---|---|---|---|
| Zoom ratio 2.75 | | | |
| Focal length | 24.72 | 40.97 | 67.90 |
| F-number | 4.12 | 4.12 | 4.12 |
| Half angle of view (degrees) | 41.19 | 27.84 | 17.67 |
| Image height | 21.64 | 21.64 | 21.64 |
| Total lens length | 149.41 | 133.24 | 151.98 |
| BF | 18.00 | 24.98 | 52.42 |
| Aperture diameter | 10.01 | 11.75 | 15.20 |

-continued

| Unit: mm | | | |
|---|---|---|---|
| Object distance being infinity | | | |
| d5 | 51.39 | 19.53 | 1.66 |
| d10 | 2.37 | 3.56 | 6.40 |
| d14 | 3.04 | 4.38 | 9.25 |
| d20 | 3.99 | 7.11 | 11.56 |
| d22 | 1.28 | 4.35 | 1.37 |
| d26 | 18.00 | 24.98 | 52.42 |
| Object distance being minimum object distance | | | |
| d5 | 51.39 | 19.53 | 1.66 |
| d10 | 2.37 | 3.56 | 6.40 |
| d14 | 3.04 | 4.38 | 9.25 |
| d20 | 1.00 | 3.01 | 2.34 |
| d22 | 4.27 | 11.74 | 17.01 |
| d26 | 18.00 | 21.68 | 46.00 |

| Lens unit data | | |
|---|---|---|
| Unit | First surface | Focal length |
| 1 | 1 | −40.34 |
| 2 | 6 | 22.61 |
| 3 | 11 | −22.67 |
| 4 | 15 | 100.35 |
| 5 | 21 | 37.30 |
| 6 | 23 | −89.51 |

Numerical Embodiment 4

| Unit: mm | | | | | |
|---|---|---|---|---|---|
| Surface data | | | | | |
| Surface number | r | d | nd | vd | Effective diameter |
| 1 | 90.138 | 1.93 | 1.64000 | 60.1 | 64.47 |
| 2 | 34.322 | 11.42 | | | 53.02 |
| 3 | 291.291 | 2.00 | 1.74100 | 52.6 | 52.93 |
| 4 | 44.580 | 3.53 | 1.80810 | 22.8 | 48.60 |
| 5 | 64.063 | (Variable) | | | 48.03 |
| 6 | 26.250 | 1.42 | 1.87400 | 35.3 | 27.06 |
| 7 | 14.231 | 8.49 | 1.81600 | 46.6 | 24.19 |
| 8 | 1,276.305 | 0.11 | | | 23.12 |
| 9 | 29.367 | 2.05 | 1.85150 | 40.8 | 20.83 |
| 10 | 73.421 | (Variable) | | | 20.05 |
| 11 | 249.276 | 1.02 | 1.62004 | 36.3 | 14.80 |
| 12* | 10.913 | 1.05 | | | 13.51 |
| 13 | 10.908 | 1.93 | 1.59270 | 35.3 | 13.99 |
| 14 | 12.957 | (Variable) | | | 13.51 |
| 15 (Stop) | ∞ | 0.10 | | | (Variable) |
| 16 | 24.272 | 1.64 | 1.43875 | 94.9 | 14.39 |
| 17 | 100.729 | 5.72 | | | 14.30 |
| 18 | −30.065 | 1.12 | 1.74100 | 52.6 | 14.75 |
| 19 | 30.665 | 5.00 | 1.43875 | 94.9 | 16.74 |
| 20 | −16.493 | (Variable) | | | 17.88 |
| 21 | 40.671 | 5.89 | 1.59522 | 67.7 | 28.61 |
| 22 | −50.552 | (Variable) | | | 28.80 |
| 23 | 174.293 | 1.09 | 1.73400 | 51.5 | 28.19 |
| 24 | 23.267 | 8.36 | | | 27.57 |
| 25 | 64.541 | 4.01 | 1.87400 | 35.3 | 36.54 |
| 26* | −1,157.207 | (Variable) | | | 36.79 |
| Image plane | ∞ | | | | |

Aspherical surface data

Twelfth surface

K = 0.00000e+000 A4 = 1.80455e−005 A6 = 8.55122e−009 A8 = 2.83685e−009

-continued

| Unit: mm |
|---|

Twenty-sixth surface

K = 0.00000e+000 A4 = −1.31408e−006 A6 = −1.23124e−008 A8 = 3.21476e−011
A10 = −4.92591e−014

| Various data | | | |
|---|---|---|---|
| Zoom ratio 2.75 | | | |
| Focal length | 24.72 | 40.97 | 67.90 |
| F-number | 4.12 | 4.12 | 4.12 |
| Half angle of view (degrees) | 41.19 | 27.84 | 17.67 |
| Image height | 21.64 | 21.64 | 21.64 |
| Total lens length | 155.68 | 133.28 | 144.31 |
| BF | 18.00 | 23.25 | 47.05 |
| Aperture diameter | 9.61 | 11.27 | 14.26 |
| Object distance being infinity | | | |
| d5 | 59.71 | 23.22 | 1.92 |
| d10 | 2.47 | 3.41 | 5.51 |
| d14 | 2.90 | 3.75 | 9.03 |
| d20 | 3.71 | 7.87 | 11.93 |
| d22 | 1.00 | 3.90 | 1.00 |
| d26 | 18.00 | 23.25 | 47.05 |
| Object distance being minimum object distance | | | |
| d5 | 59.71 | 23.22 | 1.92 |
| d10 | 2.47 | 3.41 | 5.51 |
| d14 | 2.90 | 3.75 | 9.03 |
| d20 | 1.00 | 4.14 | 4.43 |
| d22 | 3.71 | 10.94 | 15.50 |
| d26 | 18.00 | 19.95 | 40.05 |

| Lens unit data | | | | | |
|---|---|---|---|---|---|
| Unit | First surface | Focal length | Lens structure length | Front principal point position | Rear principal point position |
| 1 | 1 | −47.00 | 18.88 | 7.92 | −6.81 |
| 2 | 6 | 22.73 | 12.07 | 1.80 | −5.10 |
| 3 | 11 | −22.23 | 4.00 | 1.63 | −1.15 |
| 4 | 15 | 119.24 | 13.58 | 8.30 | −4.06 |
| 5 | 21 | 38.80 | 5.89 | 1.69 | −2.10 |
| 6 | 23 | −102.90 | 13.46 | −11.58 | −25.52 |

Numerical Embodiment 5

| Unit: mm | | | | | |
|---|---|---|---|---|---|
| Surface data | | | | | |
| Surface number | r | d | nd | vd | Effective diameter |
| 1 | 68.444 | 2.39 | 1.64000 | 60.1 | 54.63 |
| 2 | 28.694 | 10.04 | | | 44.45 |
| 3 | 404.978 | 2.00 | 1.74100 | 52.6 | 44.36 |
| 4 | 33.582 | 3.44 | 1.80810 | 22.8 | 40.01 |
| 5 | 48.754 | (Variable) | | | 39.43 |
| 6 | 25.908 | 1.42 | 1.87400 | 35.3 | 26.67 |
| 7 | 14.285 | 8.39 | 1.81600 | 46.6 | 24.08 |
| 8 | ∞ | 0.10 | | | 23.14 |
| 9 | 30.176 | 2.03 | 1.85150 | 40.8 | 21.17 |
| 10 | 76.305 | (Variable) | | | 20.47 |
| 11 | 173.612 | 1.02 | 1.62004 | 36.3 | 14.97 |
| 12* | 11.142 | 1.08 | | | 13.80 |
| 13 | 11.074 | 1.39 | 1.59270 | 35.3 | 14.45 |
| 14 | 13.060 | (Variable) | | | 14.17 |
| 15 (Stop) | ∞ | 0.10 | | | (Variable) |
| 16 | 23.287 | 2.06 | 1.43875 | 94.9 | 16.10 |

-continued

| | | Unit: mm | | | |
|---|---|---|---|---|---|
| 17 | 184.773 | 5.94 | | | 16.03 |
| 18 | −30.541 | 1.12 | 1.74100 | 52.6 | 15.59 |
| 19 | 27.714 | 5.60 | 1.43875 | 94.9 | 17.65 |
| 20 | −16.436 | (Variable) | | | 18.77 |
| 21 | 37.106 | 6.55 | 1.59522 | 67.7 | 30.54 |
| 22 | −57.852 | (Variable) | | | 30.62 |
| 23 | 150.185 | 1.09 | 1.73400 | 51.5 | 29.13 |
| 24 | 22.444 | 9.90 | | | 28.02 |
| 25 | 66.609 | 4.08 | 1.87400 | 35.3 | 37.58 |
| 26* | −1,054.290 | (Variable) | | | 37.81 |
| Image plane | ∞ | | | | |

Aspherical surface data

Twelfth surface

K = 0.00000e+000 A4 = 1.88017e−005 A6 = 9.92807e−009 A8 = 3.66448e−009

Twenty-sixth surface

K = 0.00000e+000 A4 = −1.41743e−006 A6 = −7.89943e−009 A8 = 1.76767e−011
A10 = −2.63407e−014

Various data

Zoom ratio 2.75

| | | | |
|---|---|---|---|
| Focal length | 24.73 | 40.97 | 67.90 |
| F-number | 4.12 | 4.12 | 4.12 |
| Half angle of view (degrees) | 41.19 | 27.84 | 17.67 |
| Image height | 21.64 | 21.64 | 21.64 |
| Total lens length | 145.52 | 135.76 | 160.05 |
| BF | 18.00 | 25.64 | 55.54 |
| Aperture diameter | 10.30 | 12.22 | 15.80 |
| Object distance being infinity | | | |
| d5 | 46.72 | 18.81 | 1.52 |
| d10 | 2.22 | 3.61 | 7.16 |
| d14 | 3.09 | 4.59 | 10.44 |
| d20 | 4.75 | 9.48 | 14.65 |
| d22 | 1.00 | 3.88 | 1.00 |
| d26 | 18.00 | 25.64 | 55.54 |
| Object distance being minimum object distance | | | |
| d5 | 46.72 | 18.81 | 1.52 |
| d10 | 2.22 | 3.61 | 7.16 |
| d14 | 3.09 | 4.59 | 10.44 |
| d20 | 1.00 | 3.68 | 1.01 |
| d22 | 4.75 | 13.16 | 24.74 |
| d26 | 18.00 | 22.16 | 45.43 |

Lens unit data

| Unit | First surface | Focal length |
|---|---|---|
| 1 | 1 | −36.65 |
| 2 | 6 | 22.40 |
| 3 | 11 | −23.15 |
| 4 | 15 | 93.92 |
| 5 | 21 | 38.98 |
| 6 | 23 | −100.41 |

Numerical Embodiment 6

| | | Unit: mm | | | |
|---|---|---|---|---|---|
| | | Surface data | | | |
| Surface number | r | d | nd | vd | Effective diameter |
| 1 | 56.084 | 2.39 | 1.64000 | 60.1 | 47.22 |
| 2 | 23.954 | 12.15 | | | 37.92 |

-continued

| Unit: mm | | | | | |
|---|---|---|---|---|---|
| 3 | −250.581 | 2.00 | 1.74100 | 52.6 | 35.94 |
| 4 | 31.004 | 6.00 | 1.80810 | 22.8 | 32.88 |
| 5 | 45.851 | (Variable) | | | 31.11 |
| 6 | 26.002 | 1.42 | 1.87400 | 35.3 | 25.25 |
| 7 | 13.692 | 8.44 | 1.81600 | 46.6 | 23.08 |
| 8 | −193.145 | 4.32 | | | 22.32 |
| 9 | 31.938 | 2.46 | 1.85150 | 40.8 | 20.79 |
| 10 | 139.412 | (Variable) | | | 20.36 |
| 11 | 135.580 | 0.80 | 1.59270 | 35.3 | 15.52 |
| 12* | 16.446 | (Variable) | | | 14.46 |
| 13 (Stop) | ∞ | 0.10 | | | (Variable) |
| 14 | 23.592 | 1.65 | 1.43875 | 94.9 | 14.88 |
| 15 | 128.239 | 1.98 | | | 14.78 |
| 16* | −24.980 | 1.12 | 1.74100 | 52.6 | 14.66 |
| 17 | 19.504 | 4.59 | 1.43875 | 94.9 | 15.01 |
| 18 | −16.386 | (Variable) | | | 15.37 |
| 19 | 44.545 | 6.34 | 1.53775 | 74.7 | 27.80 |
| 20 | −34.913 | (Variable during focusing) | | | 28.06 |
| 21 | −78.920 | 1.50 | 1.53775 | 74.7 | 27.79 |
| 22 | −59.065 | (Variable) | | | 27.83 |
| 23 | −159.676 | 1.09 | 1.72916 | 54.7 | 26.92 |
| 24 | 23.468 | 8.57 | | | 26.36 |
| 25 | 50.846 | 5.35 | 1.87400 | 35.3 | 39.47 |
| 26* | −499.293 | (Variable) | | | 39.61 |
| Image plane | ∞ | | | | |

Aspherical surface data

Twelfth surface

K = 0.00000e+000 A4 = 6.09055e−005 A6 = 5.60809e−008 A8 = 1.15563e−008
A10 = −3.57588e−011

Sixteenth surface

K = 0.00000e+000 A4 = 3.57559e−005 A6 = −4.47350e−009 A8 = 6.77547e−009
A10 = −4.71633e−011

Twenty-sixth surface

K = 0.00000e+000 A4 = 1.08912e−006 A6 = −1.69239e−008 A8 = 4.92999e−011
A10 = −5.25597e−014

Various data

Zoom ratio 2.75

| | | | |
|---|---|---|---|
| Focal length | 24.73 | 40.97 | 67.90 |
| F-number | 4.12 | 4.12 | 4.12 |
| Half angle of view (degrees) | 41.18 | 27.84 | 17.67 |
| Image height | 21.64 | 21.64 | 21.64 |
| Total lens length | 127.16 | 127.20 | 156.57 |
| BF | 17.99 | 21.90 | 50.63 |
| Stop | | | |

Object distance being infinity

| | | | |
|---|---|---|---|
| d5 | 27.38 | 9.25 | 1.00 |
| d10 | 1.16 | 3.25 | 8.04 |
| d12 | 2.92 | 2.86 | 5.39 |
| d18 | 4.24 | 11.15 | 18.02 |
| d20 | 0.20 | 0.20 | 0.20 |
| d22 | 1.00 | 6.32 | 1.03 |
| d26 | 17.99 | 21.90 | 50.63 |

Object distance being minimum object distance

| | | | |
|---|---|---|---|
| d5 | 27.38 | 9.25 | 1.00 |
| d10 | 1.16 | 3.25 | 8.04 |
| d12 | 2.92 | 2.86 | 5.39 |
| d18 | 1.00 | 6.60 | 6.59 |
| d20 | 3.44 | 4.75 | 11.63 |
| d22 | 1.00 | 11.65 | 16.01 |
| d26 | 17.99 | 16.58 | 35.64 |

-continued

Unit: mm

Lens unit data

| Unit | First surface | Focal length |
|---|---|---|
| 1 | 1 | −26.63 |
| 2 | 6 | 20.96 |
| 3 | 11 | −31.66 |
| 4 | 13 | 3,665.00 |
| 5 | 19 | 34.85 |
| 6 | 23 | −92.01 |

Single lens data in fifth lens unit

| Lens | First surface | Focal length |
|---|---|---|
| 11 | 19 | 37.44 |
| 12 | 21 | 425.36 |

TABLE 1

| | Conditional expression | Lower limit value | Upper limit value | Embodiment 1 | Embodiment 2 | Embodiment 3 | Embodiment 4 | Embodiment 5 | Embodiment 6 |
|---|---|---|---|---|---|---|---|---|---|
| (1) | (mB − mA)/ft | 0.20 | 1.00 | 0.46 | 0.24 | 0.23 | 0.21 | 0.35 | 0.39 |
| (2) | \|fA/fB\| | 0.10 | 1.20 | 0.38 | 0.43 | 0.42 | 0.38 | 0.39 | 0.41 |
| (3) | fA/ft | 0.30 | 1.00 | 0.68 | 0.47 | 0.55 | 0.57 | 0.57 | 0.55 |
| (4) | \|mA/ft\| | 0.10 | 0.50 | 0.28 | 0.11 | 0.14 | 0.11 | 0.20 | 0.17 |
| (5) | \|mA/mB\| | 0.50 | 2.00 | 1.65 | 0.87 | 1.44 | 1.07 | 1.35 | 0.76 |
| (6) | \|γA\| | 2.50 | 6.00 | 2.58 | 4.94 | 3.52 | 2.86 | 3.40 | 3.14 |
| (7) | \|γA × mA/ft\| | 0.10 | 3.00 | 0.73 | 0.56 | 0.48 | 0.32 | 0.68 | 0.53 |
| (8) | \|(γA × mA)/(γB × mB)\| | 0.20 | 5.00 | 2.60 | 1.09 | 1.99 | 1.61 | 1.90 | 0.92 |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-035211, filed Feb. 28, 2019, which is hereby incorporated by reference herein in its entirety.

What is claimed is:

1. A zoom lens, which includes a plurality of lens units, in which an interval between each pair of adjacent lens units is changed during zooming,
the zoom lens comprising, in order from an object side to an image side:
a first lens unit having a negative refractive power;
a first lens subunit having a positive refractive power; and
a second lens subunit having a negative refractive power,
wherein, during focusing from infinity to minimum object distance, the first lens subunit is configured to move toward the object side, and the second lens subunit is configured to move toward the image side, and
wherein the following inequalities are satisfied:

$0.20<(mB-mA)/ft<1.00,$ $0.30<|fA/ft|<1.00,$ where mA is a movement amount of the first lens subunit during focusing from infinity to minimum object distance at a telephoto end, mB is a movement amount of the second lens subunit during focusing from infinity to minimum object distance at the telephoto end, ft is a focal length of the zoom lens at the telephoto end, and fA is a focal length of the first lens subunit,
wherein the movement amounts mA and mB each has a positive sign when being a movement amount from the object side to the image side.

2. The zoom lens according to claim 1, wherein the following inequality is satisfied:

$0.10<|fA/fB|<1.20,$ where fA is a focal length of the first lens subunit, and fB is a focal length of the second lens subunit.

3. The zoom lens according to claim 1, wherein the following inequality is satisfied:

$0.10<|mA/ft|<0.50.$

4. The zoom lens according to claim 1, wherein the following inequality is satisfied:

$0.50<|mA/mB|<2.00.$

5. The zoom lens according to claim 1, wherein the following inequality is satisfied:

$2.50<|γA|<6.00,$ where γA is a focus sensitivity at infinity of the first lens subunit when an image is taken at minimum object distance and at a zoom position with a highest image pickup magnification.

6. The zoom lens according to claim 1, wherein the following inequality is satisfied:

$0.10<|γA×mA/ft|<3.00,$ where γA is a focus sensitivity at infinity of the first lens subunit when an image is taken at minimum object distance and at a zoom position with a highest image pickup magnification.

7. The zoom lens according to claim 1, wherein the following inequality is satisfied:

$$0.20<|(\gamma A\times mA)/(\gamma B\times mB)|<5.00,$$

where γA is a focus sensitivity at infinity of the first lens subunit when an image is taken at minimum object distance and at a zoom position with a highest image pickup magnification, and γB is a focus sensitivity at infinity of the second lens subunit when an image is taken at minimum object distance and at the zoom position with the highest image pickup magnification.

8. The zoom lens according to claim 1, further comprising an aperture stop,
wherein the first lens subunit and the second lens subunit are arranged on the image side of the aperture stop.

9. The zoom lens according to claim 1, wherein the second lens subunit is arranged adjacent to, and on the image side of, the first lens subunit.

10. The zoom lens according to claim 1, wherein the zoom lens includes, in order and adjacent to one another on the image side of the first lens unit:
a second lens unit having a positive refractive power;
a third lens unit having a negative refractive power;
a fourth lens unit having a positive refractive power;
a fifth lens unit having a positive refractive power; and
a sixth lens unit having a negative refractive power.

11. The zoom lens according to claim 10, wherein the fifth lens unit corresponds to the first lens subunit, and the sixth lens unit corresponds to the second lens subunit.

12. The zoom lens according to claim 10, wherein the fifth lens unit includes the first lens subunit and a third lens subunit having a positive refractive power, and the sixth lens unit corresponds to the second lens subunit.

13. An image pickup apparatus comprising:
a zoom lens; and
an image pickup element configured to receive an image formed by the zoom lens,
the zoom lens being a zoom lens including a plurality of lens units, in which an interval between each pair of adjacent lens units is changed during zooming,
the zoom lens including, in order from an object side to an image side:
a first lens unit having a negative refractive power;
a first lens subunit having a positive refractive power; and
a second lens subunit having a negative refractive power,
wherein, during focusing from infinity to minimum object distance, the first lens subunit is configured to move toward the object side, and the second lens subunit is configured to move toward the image side, and
wherein the following inequalities are satisfied:

$$0.20<(mB-mA)/ft<1.00,$$

$$0.30<|fA/ft|<1.00,$$

where mA is a movement amount of the first lens subunit during focusing from infinity to minimum object distance at a telephoto end, mB is a movement amount of the second lens subunit during focusing from infinity to minimum object distance at the telephoto end, ft is a focal length of the zoom lens at the telephoto end, and fA is a focal length of the first lens subunit,
wherein the movement amounts mA and mB each has a positive sign when being a movement amount from the object side to the image side.

14. The image pickup apparatus according to claim 13, wherein the following inequality is satisfied:

$$0.10<|fA/fB|<1.20,$$

where fA is a focal length of the first lens subunit, and fB is a focal length of the second lens subunit.

15. The image pickup apparatus according to claim 13, wherein the following inequality is satisfied:

$$0.10<|mA/ft|<0.50.$$

16. The image pickup apparatus according to claim 13, wherein the following inequality is satisfied:

$$0.50<|mA/mB|<2.00.$$

17. The image pickup apparatus according to claim 13, wherein the following inequality is satisfied:

$$2.50<|\gamma A|<6.00,$$

where γA is a focus sensitivity at infinity of the first lens subunit when an image is taken at minimum object distance and at a zoom position with a highest image pickup magnification.

18. The image pickup apparatus according to claim 13, wherein the following inequality is satisfied:

$$0.10<|\gamma A\times mA/ft|<3.00,$$

where γA is a focus sensitivity at infinity of the first lens subunit when an image is taken at minimum object distance and at a zoom position with a highest image pickup magnification.

19. A zoom lens, which includes a plurality of lens units, in which an interval between each pair of adjacent lens units is changed during zooming,
the zoom lens comprising, in order from an object side to an image side:
a first lens unit having a negative refractive power;
a second lens unit having a positive refractive power;
a third lens unit having a negative refractive power;
a fourth lens unit having a positive refractive power;
a fifth lens unit having a positive refractive power and including a first lens subunit having a positive refractive power; and
a sixth lens unit having a negative refractive power and including a second lens subunit having a negative refractive power;
wherein, during focusing from infinity to minimum object distance, the first lens subunit is configured to move toward the object side, and the second lens subunit is configured to move toward the image side, and
wherein the following inequality is satisfied:

$$0.20<(mB-mA)/ft<1.00,$$

where mA is a movement amount of the first lens subunit during focusing from infinity to minimum object distance at a telephoto end, mB is a movement amount of the second lens subunit during focusing from infinity to minimum object distance at the telephoto end, and ft is a focal length of the zoom lens at the telephoto end,
wherein the movement amounts mA and mB each has a positive sign when being a movement amount from the object side to the image side.

* * * * *